US012758361B2

(12) United States Patent
Salmon et al.

(10) Patent No.: US 12,758,361 B2
(45) Date of Patent: Oct. 13, 2026

(54) METHOD FOR GENERATING DESIGN OF ORTHODONTIC APPLIANCE

(71) Applicant: Solventum Intellectual Properties Company, Maplewood, MN (US)

(72) Inventors: Fay T. Salmon, Eden Prairie, MN (US); Karl J. L. Geisler, Saint Paul, MN (US); Jiadi Fan, Woodbury, MN (US); Tong Shen, Woodbury, MN (US); Ming-Lai Lai, Afton, MN (US); Jialin Liu, St Louis Park, MN (US); Colin A. Grambow, Maplewood, MN (US)

(73) Assignee: Solventum Intellectual Properties Company, Eagan, MN (US)

( * ) Notice: Subject to any disclaimer, the term of this patent is extended or adjusted under 35 U.S.C. 154(b) by 8 days.

(21) Appl. No.: 18/861,280

(22) PCT Filed: Apr. 18, 2023

(86) PCT No.: PCT/IB2023/053957

§ 371 (c)(1),
(2) Date: Oct. 29, 2024

(87) PCT Pub. No.: WO2023/214229

PCT Pub. Date: Nov. 9, 2023

(65) Prior Publication Data

US 2025/0281262 A1 Sep. 11, 2025

Related U.S. Application Data

(60) Provisional application No. 63/338,244, filed on May 4, 2022.

(51) Int. Cl.
*A61C 7/00* (2006.01)

(52) U.S. Cl.
CPC .................................. *A61C 7/002* (2013.01)

(58) Field of Classification Search
CPC ............. A61C 7/002; A61C 7/08; A61C 7/00
(Continued)

(56) References Cited

U.S. PATENT DOCUMENTS

| | | | | |
|---|---|---|---|---|
| 7,972,134 | B2 * | 7/2011 | Lai | A61C 7/00 433/24 |
| 10,970,436 | B2 | 4/2021 | Zhou | |

(Continued)

FOREIGN PATENT DOCUMENTS

| | | | |
|---|---|---|---|
| CN | 110916820 | A | 3/2020 |
| CN | 112545679 | A | 3/2021 |

(Continued)

OTHER PUBLICATIONS

Durkee. "The Non linear Stress strain Behavior of the Human Periodontal Ligament and Its Effect on Finite Element Models of Dental Structures". Doctorate Tesis. University of Maryland. Sep. 1996. pp 1-24.

(Continued)

*Primary Examiner* — Matthew M Nelson

(57) ABSTRACT

A method for generating a design of an orthodontic appliance includes receiving a digital three-dimensional (3D) representation of at least one tooth. The method further includes accessing a Reduced Order Model (ROM) of a periodontal ligament (PDL) of the at least one tooth in the digital 3D representation. The ROM represents a mechanical response of the PDL of the at least one tooth. The method further includes generating the design of the orthodontic appliance based at least partially on the ROM of the PDL of the at least one tooth.

20 Claims, 18 Drawing Sheets

(58) Field of Classification Search
USPC .............................................................. 433/24
See application file for complete search history.

(56) References Cited

U.S. PATENT DOCUMENTS

| | | | | |
|---|---|---|---|---|
| 11,291,524 | B1 * | 4/2022 | Wucher | A61C 7/002 |
| 12,491,048 | B2 * | 12/2025 | Kitching | A61C 7/00 |
| 2006/0275736 | A1 * | 12/2006 | Wen | A61C 9/00 433/213 |
| 2010/0280798 | A1 * | 11/2010 | Pattijn | A61C 7/002 703/1 |
| 2018/0189434 | A1 * | 7/2018 | Zhou | G06F 30/23 |
| 2020/0100864 | A1 * | 4/2020 | Wang | B33Y 80/00 |
| 2020/0100866 | A1 * | 4/2020 | Medvinskaya | G01N 33/442 |
| 2020/0214800 | A1 * | 7/2020 | Matov | G16H 20/00 |
| 2021/0022832 | A1 * | 1/2021 | Yancey | A61C 9/0046 |
| 2021/0196429 | A1 * | 7/2021 | Shojaei | A61C 7/08 |
| 2021/0353393 | A1 * | 11/2021 | Kearney | A61B 5/0088 |
| 2022/0104920 | A1 * | 4/2022 | Wang | A61C 7/08 |
| 2022/0142740 | A1 * | 5/2022 | Shojaei | A61C 7/002 |
| 2022/0265391 | A1 * | 8/2022 | Wucher | A61B 5/1121 |
| 2022/0265392 | A1 * | 8/2022 | Wucher | G16H 50/20 |
| 2024/0227300 | A1 * | 7/2024 | Meenakshisundaram | B29C 64/40 |
| 2024/0299134 | A1 * | 9/2024 | Wen | G16H 30/20 |
| 2025/0160616 | A1 * | 5/2025 | Michou | G16H 30/40 |
| 2025/0281262 | A1 * | 9/2025 | Salmon | A61C 7/002 |

FOREIGN PATENT DOCUMENTS

| | | | | | |
|---|---|---|---|---|---|
| CN | 116137057 | A | * | 5/2023 | G06T 17/20 |
| CN | 111027111 | B | | 6/2023 | |
| CN | 111046451 | B | | 6/2023 | |
| CN | 116562068 | A | * | 8/2023 | G06F 30/23 |
| EP | 3622914 | A1 | | 3/2020 | |
| EP | 3988048 | A1 | * | 4/2022 | A61C 7/002 |
| KR | 100914689 | B1 | | 8/2009 | |
| KR | 101838992 | B1 | | 3/2018 | |
| KR | 2019003084 | A | * | 1/2019 | |
| KR | 101986801 | B1 | | 6/2019 | |
| WO | WO-2022149020 | A1 | * | 7/2022 | A61B 5/0048 |
| WO | WO-2023214229 | A1 | * | 11/2023 | A61C 7/002 |

OTHER PUBLICATIONS

International Search report for PCT International Application No. PCT/IB2023/053957 mailed on Jul. 18, 2023, 4 pages.

Lai, Lei-Jie & Zhu, Zi-Na. (2016). Modeling and Analysis of a Compliance Model and Rotational Precision for a Class of Remote Center Compliance Mechanisms. Applied Sciences. 6. 388. 10.3390/app6120388.

Nyashin, Y., Nyashin, M., Osipenko, M., Lokhov, V., Dubinin, A., Rammerstorfer, F., & Zhurov, A. (2015). Centre of resistance and centre of rotation of a tooth: experimental determination, computer simulation and the effect of tissue nonlinearity. Computer Methods in Biomechanics and Biomedical Engineering, 19(3), 229-239.

Provatidis, Christopher G. "A Comparative FEM-Study of Tooth Mobility Using Isotropic and Anisotropic Models of the Periodontal Ligament." Medical engineering & physics 22.5 (2000): 359-370. Web.

Savignano, Roberto, Rodrigo F Viecilli, and Udochukwu Oyoyo. "Three-Dimensional Nonlinear Prediction of Tooth Movement from the Force System and Root Morphology." The Angle orthodontist 90.6 (2020): 811-822.

* cited by examiner

METHOD FOR GENERATING DESIGN OF ORTHODONTIC APPLIANCE

CROSS REFERENCE TO RELATED APPLICATIONS

This application is a national stage filing under 35 U.S.C. 371 of PCT/IB2023/053957, filed Apr. 18, 2023, which claims the benefit of U.S. Provisional Application No. 63/338,344, filed May 4, 2022, the disclosures of which are incorporated by reference in their entirety herein.

TECHNICAL FIELD

The present disclosure relates generally to a method for generating a design of an orthodontic appliance for an orthodontic treatment.

BACKGROUND

Orthodontic treatments are conducted by dental practitioners for moving one or more teeth of a patient from a malposition to a desired position in a patient. The orthodontic treatments may improve a facial appearance of the patient. In some cases, the orthodontic treatments may also improve function of the one or more teeth by providing improved occlusion during mastication. In some cases, orthodontic appliances, for example, orthodontic brackets and aligners, may be used in the orthodontic treatments. Positions of the one or more teeth during the orthodontic treatment may represent a balancing-act between forces and/or moments delivered by the orthodontic appliances and mechanical responses of the one or more teeth, specifically the mechanical response of a periodontal ligament of each of the one or more teeth anchored into the mandibular/maxillary bone.

SUMMARY

In an aspect, the present disclosure provides a method for generating a design of an orthodontic appliance. The method includes receiving a digital three-dimensional (3D) representation of at least one tooth. The method further includes accessing a Reduced Order Model (ROM) of a periodontal ligament (PDL) of the at least one tooth in the digital 3D representation. The ROM represents a mechanical response of the PDL of the at least one tooth. The method further includes generating the design of the orthodontic appliance based at least partially on the ROM of the PDL of the at least one tooth.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
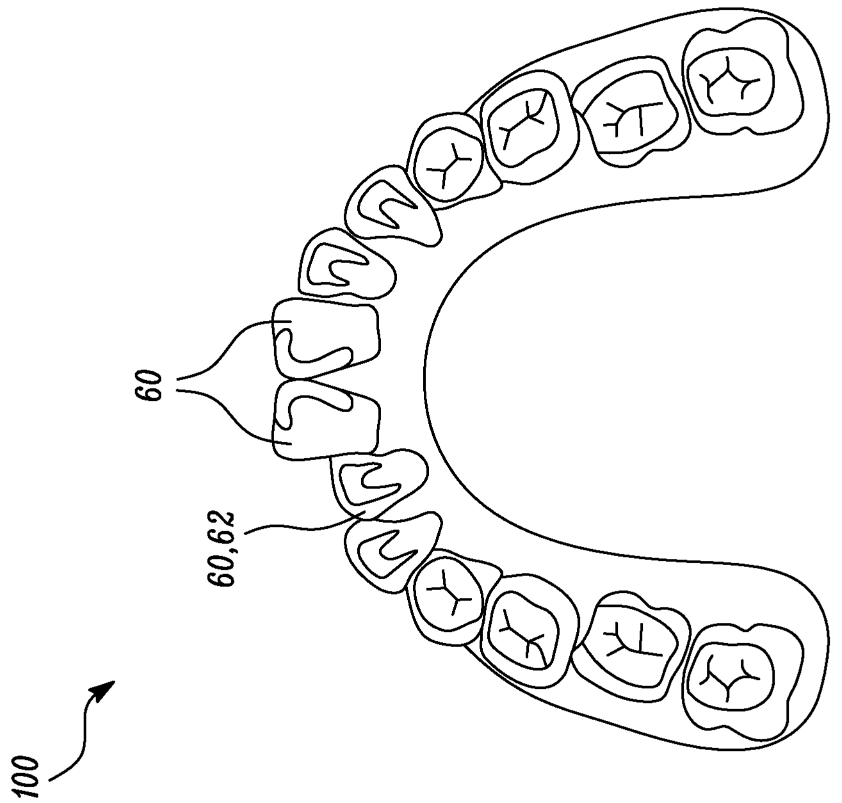
FIG. 1 is a schematic view of a digital three-dimensional (3D) representation of a dental arch of a patient undergoing an orthodontic treatment, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

Terms such as same, equal, uniform, constant, strictly, and the like, are understood to be within the usual tolerances or measuring error applicable to the particular circumstance rather than requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the term "three-dimensional representation," refers to any three-dimensional surface map of an object, such as a point cloud of surface data, a set of two-dimensional polygons, or any other data representing all or some of the surface of an object, as might be obtained through the capture and/or processing of three-dimensional scan data, unless a different meaning is explicitly provided or otherwise clear from the context. A "three-dimensional representation" may include volumetric and other representations, unless a different meaning is explicitly provided or otherwise clear from the context.

As used herein, the term "Reduced order model (ROM)" refers to simplification of a high-fidelity, complex model. The ROM captures the behavior of a source model so that a system's dominant effects can be studied using minimal computational resources.

As used herein, the term "physics-based mathematical model (PMM)" refers to a model representation based on general laws of physics and mathematical concepts, formulas, or equations.

As used herein, the term "center of resistance (CoR)" refers to a point in the root region of a tooth at which resistance to movement of a tooth and PDL system can be concentrated for analysis, Conceptually, translational forces applied at the CoR only produce translational displacements of the tooth, and rotational forces (moments) applied at the CoR only produce rotational displacements of the tooth. The CoR is typically located in a root region of the tooth and may be inside or outside the root volume, depending on root shape and quantity. In reality, the COR may be different for different forces, and the CoR concept may be more accurately described as a small volume in 3-dimensional space or average CoR point.

As used herein, the term "finite element analysis (FEA)" may refer to simulation of any given physical phenomenon using a numerical technique called Finite Element Method (FEM). The FEM is a systematic procedure of approximating continuous functions as discrete models.

As used herein, the term "calibration" may be defined as finding a unique set of model parameters that provide a good description of a system behavior, and can be achieved by confronting model predictions with measurements performed on the system.

Conventionally, finite-element methods (FEMs) are typically used for simulation of orthodontic biomechanics. Positions of the one or more teeth during the orthodontic treatment may represent a balancing-act between forces and moments delivered by orthodontic appliances and mechanical responses of the one or more teeth, specifically the mechanical response of a periodontal ligament (PDL) of each of the one or more teeth anchored into the mandibular/maxillary bone. As a result, finite-element models generated by the FEMs include a detailed representation of the PDLs.

However, due to concerns about patient and staff radiation exposure, use of x-rays or any other imaging techniques in the orthodontic treatment may be limited. Therefore, patient root geometries are not readily available for treatment planning, treatment diagnostics, and product development activities. Further, the detailed representation of the PDL in a PMM may lead to longer solve times and may impede solution convergence. In addition, as the PDL is fibrous in nature, its stress/strain response is non-linear and differs when the fibers are in tension or compression. Therefore, it may be important to include complex material models of the PDL for finite-element analysis and simulations. This may further increase solve times and may impede solution convergence. Therefore, conventional finite element models generated by the FEMs typically treat the PDL as linear elastic and use a same proportionality factor (i.e., modulus) in tension and compression.

Further, tooth root and PDL geometries extracted from the x-ray or any other imaging techniques may contain inaccuracies. Inaccuracies in thickness profile of the detailed representation of the PDL, in particular, may have a huge impact on results. Moreover, the mechanical responses of the tooth for patients with different dental arrangements and conditions may also add large source of variability and unpredictability.

However, models for predicting the orthodontic biomechanics can still far outweigh accuracy challenges when considering other methods of predicting orthodontic biomechanics, such as trends, relative comparisons, and performance ranges.

Therefore, a practical and easy to implement representation is required for predicting the orthodontic biomechanics, such as the mechanical response of the PDL in orthodontic tooth movement simulations.

The present disclosure relates to a method for generating a design of an orthodontic appliance. The orthodontic appliance may be used in orthodontic treatments for moving one or more teeth of a patient from a malposition to a desired position in a dentition of the patient.

The method includes receiving a digital three-dimensional (3D) representation of at least one tooth. The method further includes accessing a Reduced Order Model (ROM) of a periodontal ligament (PDL) of the at least one tooth in the digital 3D representation. The ROM represents a mechanical response of the PDL of the at least one tooth. The method further includes generating the design of the orthodontic appliance based at least partially on the ROM of the PDL of the at least one tooth.

The method for generating the design of the orthodontic appliance based at least partially on the ROM of the PDL of the at least one tooth may be readily implemented in finite-element models. Further, the ROM of the PDL may accurately represent the mechanical response of the PDL to applied forces with reduced degrees of freedom (DOF) which may lead to about two orders of magnitude of reduction in simulation time. The ROM may retain critical information and relationships of the detailed representation of the PDL, and may further accurately represent the mechanical response of the PDL of the at least one tooth to the applied forces. In some cases, the simulation time may be reduced from hours to seconds.

Referring now to the Figures, FIG. 1 illustrates a digital three-dimensional (3D) representation 100 of a dental arch of a patient undergoing an orthodontic treatment, according to an embodiment of the present disclosure. It may be noted that the dental arch shown in FIG. 1 is a lower dental arch of the patient. In some other embodiments, the dental arch may include an upper dental arch of the patient. The dental arch includes a plurality of teeth 60. In the illustrated embodiment of FIG. 1, the digital 3D representation 100 represents an initial arrangement of at least one tooth 62 from the plurality of teeth 60. The at least one tooth 62 of the patient may be malpositioned. Therefore, the patient may be required to undergo the orthodontic treatment to correct malpositioning of the at least one tooth 62. The at least one tooth 62 may be of the lower dental arch or the upper dental arch of the patient. Correcting the malpositioning of the at least one tooth 62 may improve facial appearance of the patient. Furthermore, correcting the malpositioning of the at least one tooth 62 may enhance function of the at least one tooth 62 by providing improved occlusion during mastication.

Figure 2:
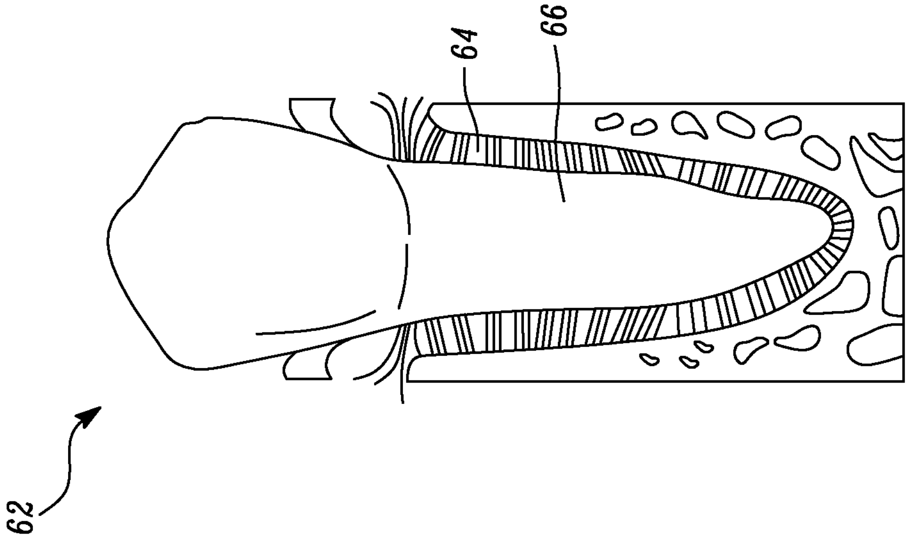
FIG. 2 is a schematic sectional view of at least one tooth and a periodontal ligament (PDL) of the at least one tooth, according to an embodiment of the present disclosure.

FIG. 2 shows an exemplary schematic sectional view of the at least one tooth 62 and a periodontal ligament (PDL) 64 of the at least one tooth 62. The at least one tooth 62 may include one or more of a central incisor, a lateral incisor, a canine, a premolar, a first molar, a second molar, and a third molar. In the illustrated embodiment of FIG. 1, the at least one tooth 62 is a canine. Further, the at least one tooth 62 includes only one root 66. In some other embodiments, the at least one tooth 62 may include two or more roots 66. For example, the at least one tooth 62 may include two or more roots 66 when the at least one tooth 62 is a molar (e.g., the first molar, the second molar, or the third molar).

Figure 3:
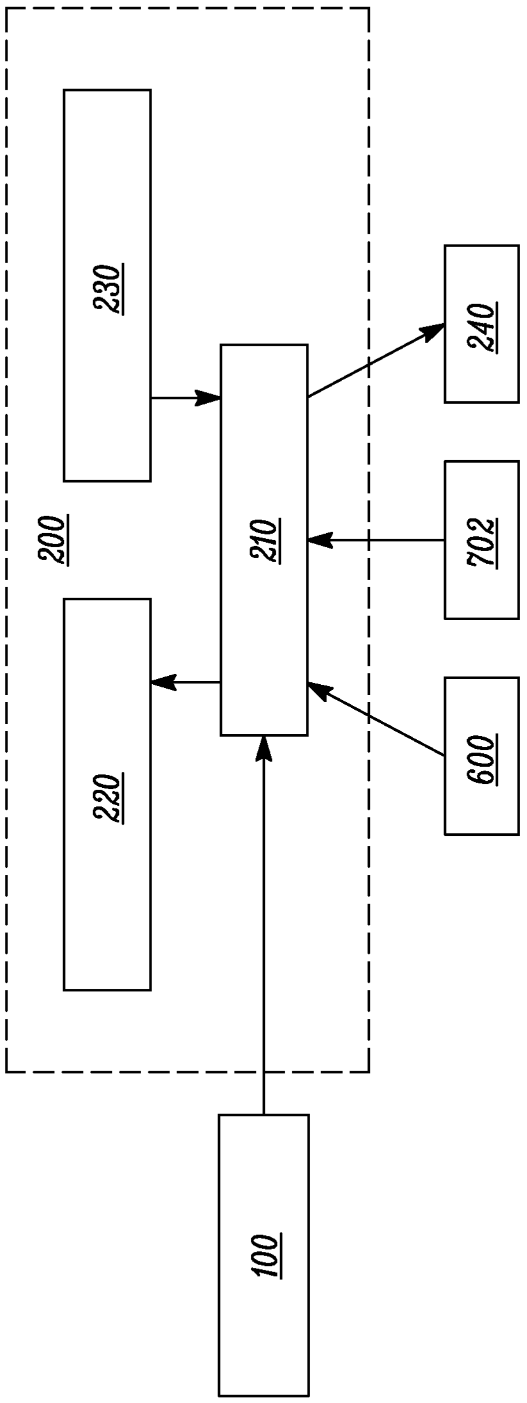
FIG. 3 is a schematic block diagram of a system for generating a design of an orthodontic appliance, according to an embodiment of the present disclosure.

FIG. 3 illustrates a schematic block diagram of a system 200 for generating a design of an orthodontic appliance (e.g., an orthodontic appliance 700 shown in FIG. 10), according to an embodiment of the present disclosure. In some embodiments, the orthodontic appliance is at least one of an aligner, braces, or combinations thereof. In some other embodiments, the orthodontic appliance may be a retainer. The orthodontic appliance may be any appliance configured to apply forces and/or moments on the at least one tooth 62 (shown in FIG. 1) to move the at least one tooth 62 from the initial arrangement (i.e., a malposition) shown in FIG. 1 to a target arrangement (i.e., a desired position) shown in FIG. 9 in a dentition of the patient.

The system 200 includes a processor 210. The processor 210 is capable of executing one or more instructions. In some embodiments, the one or more instructions are stored in a memory. When the one or more instructions are executed by the processor 210, the one or more instructions cause the processor 210 to perform one or more of the actions, operations, methods, or functions described herein.

In some embodiments, the processor 210 may include any suitable data processor for processing data. For example, the processor 210 may include a microprocessor, a microcontroller, a computer, or other suitable devices that control operation of devices and execute programs. Various other examples of the processor 210 include central processing units ("CPUs"), microcontrollers, programmable logic devices, field programmable gate arrays, digital signal processing ("DSP") devices, and the like. The processor 210 may include any general variety device such as a reduced instruction set computing ("RISC") device, a complex instruction set computing ("CISC") device, or a specially designed processing device, such as an application-specific integrated circuit ("ASIC") device.

In some embodiments, the processor 210 is configured to receive the digital 3D representation 100 of the at least one tooth 62. The processor 210 can receive the digital 3D representation 100 locally or remotely via a network. In some embodiments, the processor 210 may be configured to receive the digital 3D representation 100 from the memory. In some embodiments, the processor 210 may be configured to receive the digital 3D representation 100 from an external database. In some embodiments, the processor 210 may be configured to receive the digital 3D representation 100 from the memory or the external database including the patient's file history or from a previous digital data capture. In some other embodiments, the processor 210 may be configured to retrieve the digital 3D representation 100 from a CAD file.

In some embodiments, dental practitioners may optically scan the at least one tooth 62 or the dental arch of the patient undergoing the orthodontic treatment to generate the digital 3D representation 100. In some embodiments, the dental practitioners may perform an intraoral scan to generate the digital 3D representation 100. In some embodiments, the dental practitioners may perform a digital data capture, a computed tomography (CT), or a computer-aided tomography (CAT) of the dental arch of the patient to generate the digital 3D representation 100. In some other embodiments, the dental practitioners may indirectly perform a digital data capture of the dental arch of the patient by performing a digital data capture of a plaster model of the dental arch of the patient or of a dental impression of the dental arch of the patient, rather than directly capturing digital 3D representation 100 of the dental arch of the patient. In the case of using the dental impression, the digital data capture may be inverted from a negative volume to a positive volume. In some cases, the dental practitioners may send the digital 3D representation 100 to a manufacturing facility for generating the design of the orthodontic appliance and fabricating the orthodontic appliance.

In some embodiments, the system 200 may also include a display device 220 for displaying the digital 3D representation 100 of the at least one tooth 62 or the design of the orthodontic appliance. The display device 220 can be implemented with any electronic display, for example a Cathode Ray Tube (CRT), a liquid crystal display (LCD), light emitting diode (LED) display, or organic light emitting diode (OLED) display.

In some embodiments, the system 200 further includes an input device 230 for receiving user commands or other information, for example to modify the design of the orthodontic appliance. The input device 230 can be implemented with any device for entering information or commands, for example a keyboard, a microphone, a cursor-control device, or a touch screen.

In some embodiments, the system 200 is in communication with a manufacturing device 240. In some embodiments, the manufacturing system may be included in the system 200. In some embodiments, the manufacturing device 240 may be a 3D printer.

In some embodiments, the manufacturing device 240 may be configured to fabricate the orthodontic appliance using at least one of an additive manufacturing process and a subtractive manufacturing process. The additive manufacturing process may include stereolithography (SLA) in which successive layers of material are laid down by the manufacturing device 240 under control of the processor 210 or a processor of the manufacturing device 240. In other examples, the additive manufacturing process may include Fused Filament Fabrication (FFF). Powder Bed Fusion (PBF), and the like. The subtractive manufacturing process may include forming the orthodontic appliance from a blank by a milling process. The blank generally refers to a solid block of material from which the orthodontic appliance can be machined. In general, the blanks are attached to a support, a stub, or a mandrel that fits into the manufacturing device 240. In some embodiments, the blank may have a rough shape of an outer contour of the orthodontic appliance.

In some embodiments, the manufacturing device 240 may be a thermoforming device configured for vacuum forming or positive pressure forming. In such a case, a model of a patient's tooth/teeth may be fabricated, for example, by an additive manufacturing process. Further, the model is used to fabricate the orthodontic appliance by means of heating a material the orthodontic appliance is to be made of and subsequently drawing the material over the model by means of a vacuum or positive pressure. In some embodiments, the material may be a transparent thermoplastic material. After the orthodontic appliance has been formed, the orthodontic appliance and the model can be separated from each other. Subsequently, the orthodontic appliance can be trimmed (optionally automated by CNC or robotic machinery, such as, end mill or LASER cutter) to remove excess material.

In some embodiments, the manufacturing device 240 may be any other manufacturing device configured to fabricate the orthodontic appliance based on the design by manufacturing processes, such as die pressing, slurry casting, injection molding, extrusion processes, rapid prototyping, and the like.

In some embodiments, the orthodontic appliance may be fabricated as a single part. In some other embodiments, different parts of the orthodontic appliance may be manufactured separately, and then assembled together by a suitable process.

In some embodiments, the manufacturing device 240 may also include an input device or an output device, such as a control input (e.g., button, touchpad, thumbwheel, etc.), or a display (e.g., LCD or LED display) to provide manufacturing status information.

In some other embodiments, the system 200 may not include the manufacturing device 240. In such cases, the processor 210 may send the design of the orthodontic appliance generated by the system 200 to the manufacturing facility for fabricating the orthodontic appliance.

The system 200 can be implemented with, for example, a desktop, a notebook, or a tablet computer. The components of the system 200 may be combined, e.g., the tablet computer can incorporate the processor 210, the display device 220, and the input device 230 into a single unit.

Figure 4:
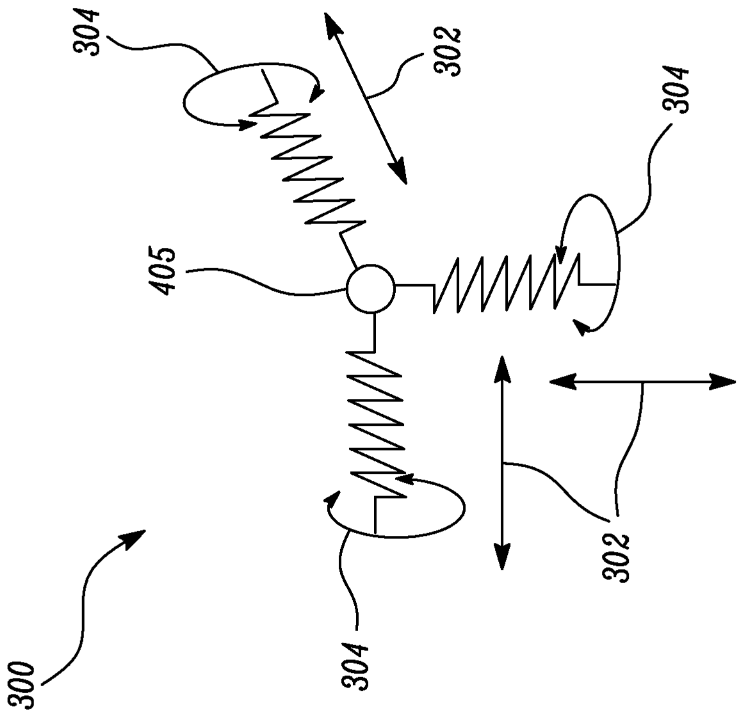
FIG. 4 is a schematic view of a Reduced Order Model (ROM) of the PDL of the at least one tooth, according to an embodiment of the present disclosure.

FIG. 4 illustrates a schematic diagram of a Reduced Order Model (ROM) 300 of the PDL 64 (shown in FIG. 2) of the at least one tooth 62 (shown in FIG. 2), according to an embodiment of the present disclosure. The ROM 300 represents a mechanical response of the PDL 64 of the at least one tooth 62. Specifically, the ROM 300 represents the mechanical response of the PDL 64 of the at least one tooth 62 to applied forces (e.g., orthodontic force parameters 430 shown in FIG. 5). In some embodiments, the ROM 300 of the PDL 64 is independent of the applied forces.

The ROM 300 may help to accurately predict tooth displacements (e.g., tooth displacements 450 shown in FIGS. 6B to 6D) for the applied forces. As illustrated in FIG. 4, the ROM 300 may include a set of spring-like elements to represent the mechanical response of the PDL 64 of the at least one tooth 62. The set of spring-like elements may include both axial and torsional springs.

In some embodiments, the ROM 300 includes a simplified mathematical representation. The simplified mathematical representation includes a plurality of numerical values representing compliance or stiffness of the PDL 64 of the at least one tooth 62 with respect to three translational degrees of freedom 302 and three rotational degrees of freedom 304.

Referring to FIGS. 1 to 4, in some embodiments, the processor 210 is configured to access the ROM 300 of the PDL 64 of the at least one tooth 62 in the digital 3D representation 100. As discussed above, in some embodiments, the at least one tooth 62 includes the plurality of teeth 60 having different characteristics. For example, the plurality of teeth 60 may have different shapes, sizes, types, or number of roots.

In some embodiments, the processor 210 is configured to access the ROM 300 of the PDL 64 for each of the plurality of teeth 60. In some embodiments, the processor 210 is configured to access the ROM 300 of the PDL 64 locally or remotely via the network.

In some embodiments, the processor 210 is further configured to generate the ROM 300 of the PDL 64 of the at least one tooth 62. In some embodiments, the processor 210 is further configured to generate the ROM 300 of the PDL 64 of each of the plurality of teeth 60.

Figure 5:
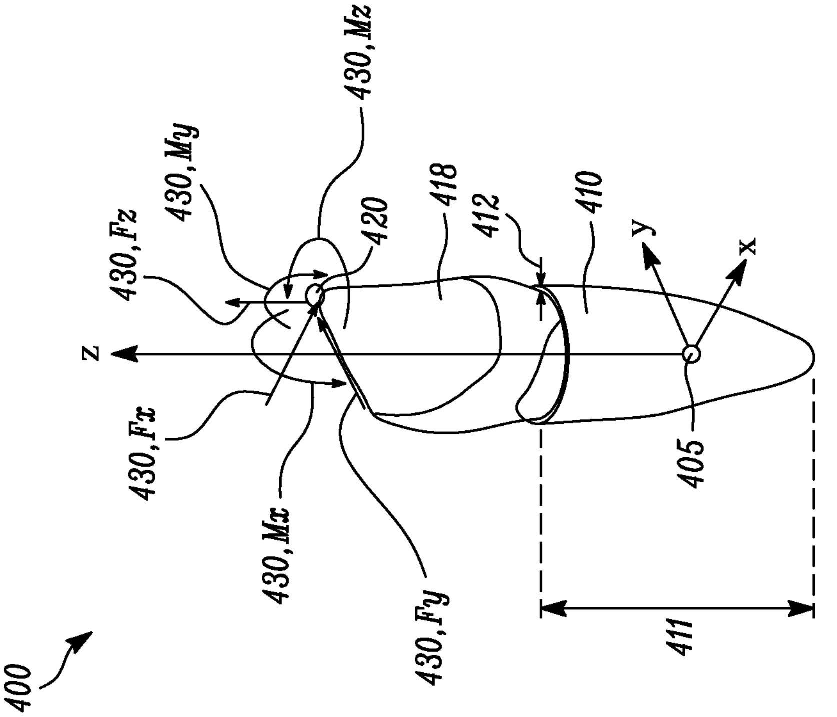
FIG. 5 is a schematic diagram of a physics-based mathematical model (PMM) of the at least one tooth, according to an embodiment of the present disclosure.

In some embodiments, the processor 210 is configured to characterize a mechanical response of a baseline PDL of the at least one tooth 62 to the plurality of orthodontic force parameters (e.g., the orthodontic force parameters 430 shown in FIG. 5). The baseline PDL of the at least one tooth 62 has a baseline height 411 (shown in FIG. 5) and a baseline thickness 412 (shown in FIG. 5). In some embodiments, the baseline height 411 is a full height of the baseline PDL. In some embodiments, the baseline height 411 is about 16.3 millimeter (mm). In some embodiments, the baseline thickness 412 is an average thickness of the baseline PDL. In some embodiments, the baseline thickness 412 is about 0.245 mm. The baseline PDL may be used to calibrate the ROM 300. The ROM 300 calibrated using the baseline PDL may be sufficiently accurate.

Further, in some embodiments, the processor 210 is configured to determine one or more ROM parameters of the ROM 300 of the baseline PDL based at least on the digital 3D representation 100. In some embodiments, the one or more ROM parameters of the ROM 300 include, but are not limited to, one or more stiffness parameters or one or more compliance parameters.

In some embodiments, one or more ROM parameters are determined from experimental measurements of the relationship between forces and displacements of actual teeth in human or animal subjects.

In some embodiments, one or more ROM parameters are determined by finding the best fit between tooth movement predicted using a PMM and observed movement of at least one tooth during at least a portion of orthodontic treatment conducted on at least one patient.

FIG. 5 illustrates a schematic diagram of a physics-based mathematical model (PMM) 400 of the at least one tooth 62 (shown in FIG. 2), according to an embodiment of the present disclosure. The PMM 400 is based on the digital 3D representation 100 (shown in FIG. 1). Specifically, the PMM 400 of the at least one tooth 62 is based on the digital 3D representation 100. The PMM 400 includes at least a PDL model 410. In some embodiments, the PMM 400 may further include a tooth model 418.

In some embodiments, the processor 210 (shown in FIG. 3) is configured to generate the PMM 400 based on the digital 3D representation 100. In some embodiments, the processor 210 is configured to generate the PDL model 410 of the at least one tooth 62 based on non-linear material characteristics of the baseline PDL of the at least one tooth 62. In some embodiments, hyperelastic material models may be used to describe the non-linear material characteristics of the baseline PDL of the at least one tooth 62. The hyperelastic material models may capture PDL compression and tension behavior accurately.

In some embodiments, the non-linear material characteristics of the baseline PDL are according to Equation 1 provided below:

$$U = \sum_{i=1}^{N} \frac{2\mu_i}{\alpha_i^2}\left[\lambda_1^{\alpha_i} + \lambda_2^{\alpha_i} + \lambda_3^{\alpha_i} - 3 + \frac{1}{\beta_i}\left(\left(J^{el}\right)^{-\alpha_i\beta_i} - 1\right)\right] \tag{1}$$

where, $\lambda_1$, $\lambda_2$, $\lambda_3$ are principal stretches, $J^{el}$ is a volumetric stretch, $m_i$, $\alpha_i$, $\beta_i$, are fitted parameters, and i=1, 2 . . . N.

Further, the at least one tooth 62 and its jaw bone can be approximated as rigid bodies. Therefore, in some embodiments, the processor 210 is configured to generate the tooth model 418 of the at least one tooth 62 based on rigid material characteristics of the at least one tooth 62.

In some embodiments, the ROM 300 (shown in FIG. 4) is determined based on the PMM 400. In such embodiments, the processor 210 is configured to determine, for the at least one tooth 62, a plurality of tooth movement parameters (e.g., a tooth movement parameter 440 shown in FIGS. 6B-6C) corresponding to the plurality of orthodontic force parameters 430 applied at a reference point 420 disposed on or within the at least one tooth 62 based on the PMM 400. In other words, the PMM 400 is simulated a plurality of times by applying the plurality of orthodontic force parameters 430 at the reference point 420 to determine the plurality of tooth movement parameters corresponding to the plurality of orthodontic force parameters 430 applied at the reference point 420. Each of the plurality of orthodontic force parameters 430 may include a combination of axial and torsional forces, such as Fx, Fy, Fz, Mx, My, and Mz. The plurality of orthodontic force parameters 430 may include different combinations of the orthodontic force parameters 430. The location of the reference point 420 is arbitrary and may be defined on the surface or within the volume of the at least one tooth 62. In some embodiments, the reference point is located in the center of the root volume near an expected location of the center of resistance.

Figure 6A:
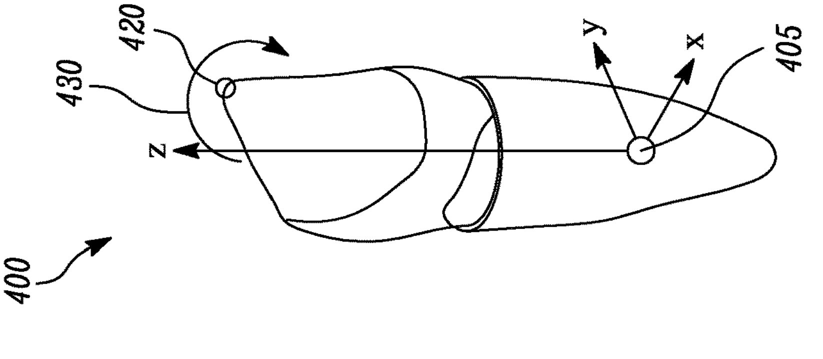
FIG. 6A is a schematic isometric view of the PMM and an orthodontic force parameter applied at a reference point, according to an embodiment of the present disclosure.
Figure 6B:
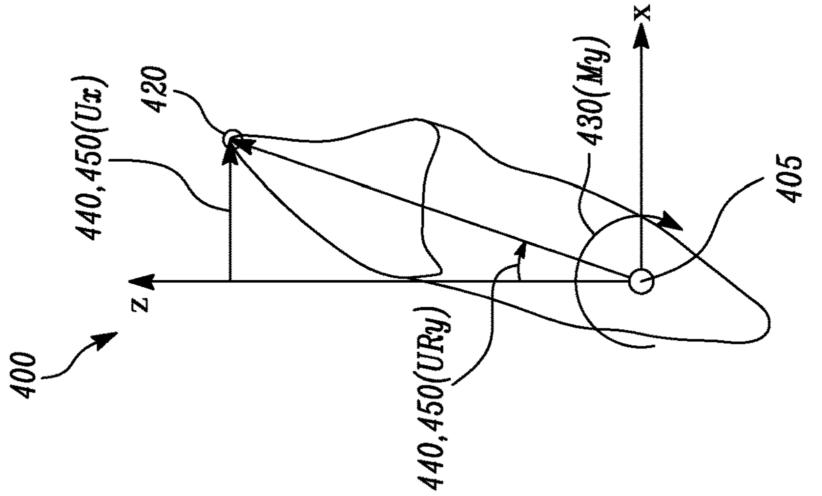
FIG. 6B is a schematic side view of the PMM upon application of the orthodontic force parameter at the reference point, according to an embodiment of the present disclosure.
Figure 6C:
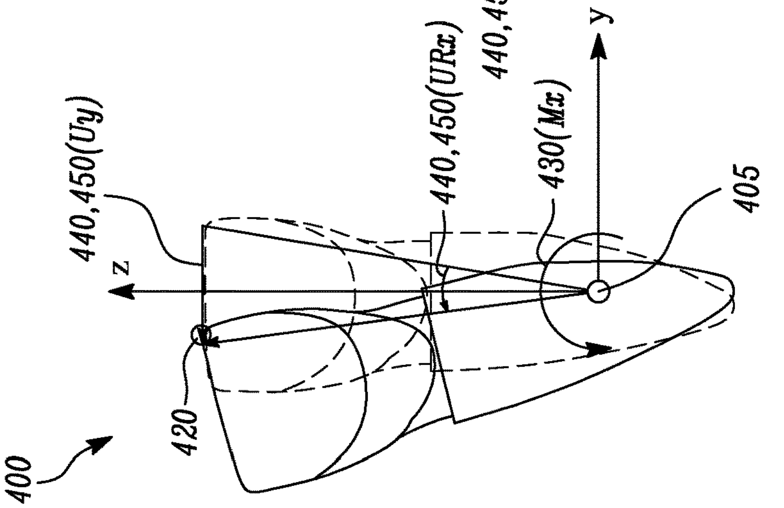
FIG. 6C is a schematic front view of the PMM upon application of the orthodontic force parameter at the reference point, according to an embodiment of the present disclosure.
Figure 6D:
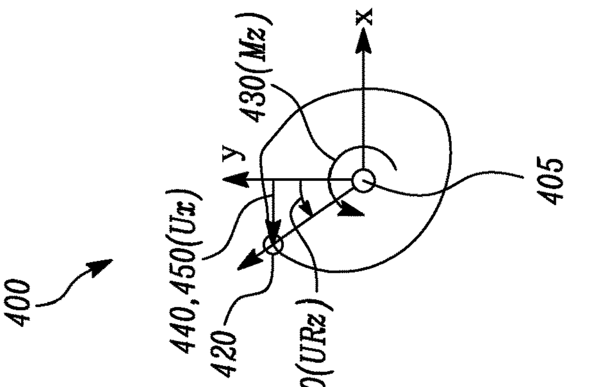
FIG. 6D is a schematic top view of the PMM upon application of the orthodontic force parameter at the reference point, according to an embodiment of the present disclosure.

FIG. 6A illustrates a schematic isometric view of the PMM 400 and an orthodontic force parameter 430 from the plurality of orthodontic force parameters 430 applied at the reference point 420. FIG. 6B illustrates a schematic side view of the PMM 400 upon application of the orthodontic force parameter 430 at the reference point 420. FIG. 6C illustrates a schematic front view of the PMM 400 upon application of the orthodontic force parameter 430 at the reference point 420. FIG. 6D illustrates a schematic top view of the PMM 400 upon application of the orthodontic force parameter 430 at the reference point 420.

Referring to FIGS. 4, 5, and 6A-6C, in some embodiments, each of the plurality of tooth movement parameters 440 includes a plurality of tooth displacements 450 at the reference point 420 due to an application of a corresponding orthodontic force parameter 430 from the plurality of orthodontic force parameters 430 at the reference point 420. In some embodiments, the plurality of tooth displacements 450 may include a plurality of axial and torsional displacements, such as Ux, Uy, Uz, URx, URy, and URz (collectively referred as "the plurality of tooth displacements U") due to the application of the corresponding orthodontic force parameter Fx, Fy, Fz, Mx, My, and Mz (collectively referred as "the plurality of orthodontic force parameters F") from the plurality of orthodontic force parameters 430 at the reference point 420.

In some embodiments, the processor 210 (shown in FIG. 3) is configured to determine a calibrated compliance matrix $C_{RP}$ of the baseline PDL of the at least one tooth 62 (shown in FIG. 2) based at least on the plurality of tooth movement parameters 440 (i.e., the plurality of tooth movement parameters U in Equation 2 provided below) and the plurality of orthodontic force parameters 430 (i.e., the plurality of orthodontic force parameters F in Equation 2 provided below). In some embodiments, the calibrated compliance matrix $C_{RP}$ provides a correlation between the plurality of orthodontic force parameters 430 and the plurality of tooth movement parameters 440. In some embodiments, the calibrated compliance matrix $C_{RP}$ is according to Equation 2 provided below:

$$U = C_{RP}F = \begin{pmatrix} c11 & c12 & c13 & c14 & c15 & c16 \\ c12 & c22 & c23 & c24 & c25 & c26 \\ c13 & c23 & c33 & c34 & c35 & c36 \\ c14 & c24 & c34 & c44 & c45 & c46 \\ c15 & c25 & c35 & c45 & c55 & c56 \\ c16 & c26 & c36 & c46 & c56 & c66 \end{pmatrix} \begin{Bmatrix} Fx \\ Fy \\ Fz \\ Mx \\ My \\ Mz \end{Bmatrix} \tag{2}$$

In some embodiments, the processor 210 is further configured to determine a plurality of center of resistance parameters $x_{CoR}$, $y_{CoR}$, $z_{CoR}$ of the baseline PDL of the at least one tooth 62 based on the calibrated compliance matrix $C_{RP}$. In some embodiments, the processor 210 is configured to determine the plurality of center of resistance parameters $x_{CoR}$, $y_{CoR}$, $z_{CoR}$ based on the calibrated compliance matrix $C_{RP}$ through kinematic analysis of the plurality of tooth movement parameters 440. In some embodiments, the plurality of center of resistance parameters $x_{CoR}$, $y_{CoR}$, $z_{CoR}$ based on the calibrated compliance matrix $C_{RP}$ are determined based on Equation 3 provided below:

$$x_{CoR} = -C35/C55 \tag{3}$$

$$y_{CoR} = C34/C44$$

$$z_{CoR} = C15/C55$$

In some embodiments, the processor 210 is further configured to determine a reference mapping matrix Γ based on the plurality of center of resistance parameters $x_{CoR}$, $y_{CoR}$, $z_{CoR}$ of the baseline PDL.

In some embodiments, the reference mapping matrix Γ is according to Equation 4 provided below:

$$\Gamma = \begin{pmatrix} 1 & 0 & 0 & 0 & -rz & ry \\ 0 & 1 & 0 & rz & 0 & -rx \\ 0 & 0 & 1 & -ry & rx & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} \quad (4)$$

where, rx, ry and rz are the distances between the plurality of center of resistance parameters $x_{CoR}$, $y_{CoR}$, $z_{CoR}$ and the reference point 420, respectively.

In some embodiments, the processor 210 is configured to determine a characteristic compliance matrix $C_{COR}$ of the baseline PDL of the at least one tooth 62 based on the calibrated compliance matrix $C_{RP}$ and the reference mapping matrix Γ.

In some embodiments, the characteristic compliance matrix $C_{COR}$ represents a correlation between orthodontic force parameters applied at a center of resistance (CoR) 405 with one or more displacements at the CoR 405.

In some embodiments, the characteristic compliance matrix $C_{COR}$ is determined according to Equation 5 provided below:

$$C_{CoR} = \Gamma^{-1} C_{RP} \Gamma^{-T} \quad (5)$$

In some embodiments, the characteristic compliance matrix $C_{COR}$ is a diagonal matrix.

In some embodiments, the processor 210 is configured to determine a plurality of numerical values representing compliance of the baseline PDL based on the characteristic compliance matrix $C_{COR}$. For example, the plurality of numerical values representing compliance of the baseline PDL may be indicative of spring constants of the spring-like elements of the ROM 300 that represent the mechanical response of the PDL 64 of the at least one tooth 62. Specifically, the plurality of numerical values representing compliance of the baseline PDL may be converted through matrix inverse operation to the spring constants of the spring-like elements of the ROM 300 that represent the mechanical response of the PDL 64 of the at least one tooth 62. In some embodiments, the plurality of numerical values representing compliance of the baseline PDL can be directly obtained from the characteristic compliance matrix $C_{COR}$.

In some other embodiments, the processor 210 is configured to determine a stiffness matrix as an inverse of the characteristic compliance matrix $C_{COR}$. In such embodiments, the processor 210 is configured to determine the plurality of numerical values representing stiffness of the baseline PDL based on the stiffness matrix. For example, the plurality of numerical values representing stiffness of the baseline PDL may be the spring constants of the spring-like elements of the ROM 300 that represent the mechanical response of the PDL 64 of the at least one tooth 62.

In some embodiments, the processor 210 is configured to determine the simplified mathematical representation of the baseline PDL of the at least one tooth 62 based on the plurality of numerical values. In some embodiments, the simplified mathematical representation of the baseline PDL of the at least one tooth 62 based on the plurality of numerical values is according to the Equation 6 provided below:

$$U = C_{CoR} F = \begin{pmatrix} c11 & 0 & 0 & 0 & 0 & 0 \\ 0 & c22 & 0 & 0 & 0 & 0 \\ 0 & 0 & c33 & 0 & 0 & 0 \\ 0 & 0 & 0 & \beta 11 & 0 & 0 \\ 0 & 0 & 0 & 0 & \beta 22 & 0 \\ 0 & 0 & 0 & 0 & 0 & \beta 33 \end{pmatrix} \begin{Bmatrix} Fx \\ Fy \\ Fz \\ Mx \\ My \\ Mz \end{Bmatrix} \quad (6)$$

where, c11, c22, c33, β11, 22, β33 are the plurality of numerical values representing compliance of the baseline PDL.

The simplified mathematical representation of the baseline PDL of the at least one tooth 62 can be used for orthodontic treatment planning, orthodontic treatment diagnostics, and development of the orthodontic appliance 700.

In some embodiments, the processor 210 is configured to determine the ROM 300 based on the simplified mathematical representation of the baseline PDL of the at least one tooth 62.

Figure 7:
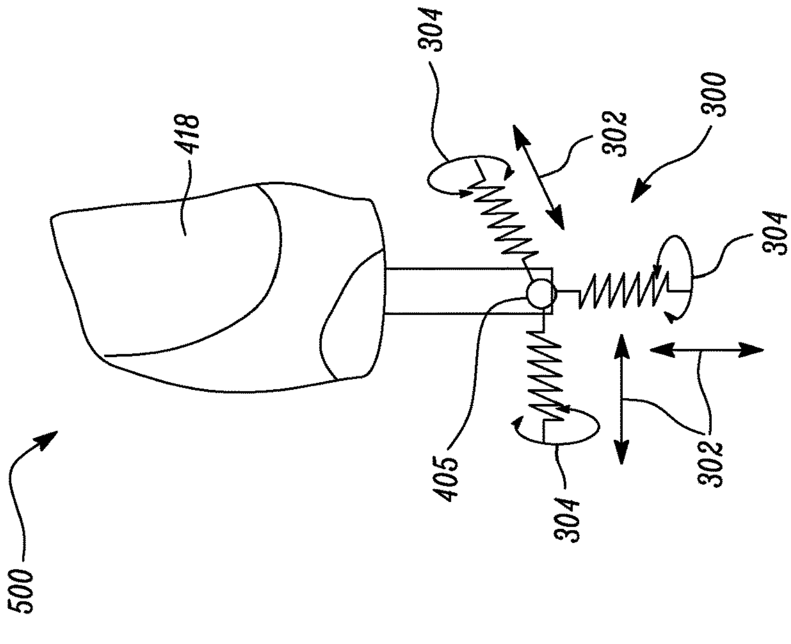
FIG. 7 is a schematic diagram of an updated PMM of the at least one tooth, according to an embodiment of the present disclosure.

FIG. 7 illustrates a schematic diagram of an updated PMM 500 of the at least one tooth 62 (shown in FIG. 2), according to an embodiment of the present disclosure. The updated PMM 500 of the at least one tooth 62 includes the ROM 300 of the PDL 64 (shown in FIG. 2) of the at least one tooth 62. Specifically, the updated PMM 500 of the at least one tooth 62 includes the ROM 300 of the PDL 64 of the at least one tooth 62 at the CoR 405.

Referring to FIGS. 1 to 7, in some embodiments, the processor 210 is configured to remove the PDL model 410 from the PMM 400 and apply the ROM 300 at the CoR 405 to generate the updated PMM 500 of the at least one tooth 62. In some embodiments, the processor 210 is configured to remove the PDL model 410 from the PMM 400 and apply the ROM 300 consisting of the set of spring-like elements to represent the mechanical response of the PDL 64 of the at least one tooth 62 at the CoR 405 to generate the updated PMM 500 of the at least one tooth 62. Applying the ROM 300 at the CoR 405 to generate the updated PMM 500 of the at least one tooth 62 may simplify the PDL model 410 and thereby reduce computation time required to predict the tooth displacements U from hours to seconds. In other words, the updated PMM 500 may require much lesser computation time as compared to computation time required by the PMM 400 of the at least one tooth 62 to predict the tooth displacements U.

Since the ROM 300 is calibrated using simulation results where the non-linear material characteristics of the PDL 64 are modeled realistically, the ROM 300 captures the mechanical response of the PDL 64 of the at least one tooth 62 by considering the non-linear material characteristics of the PDL 64. This may further ensure that the ROM 300 is accurate.

Figure 8:
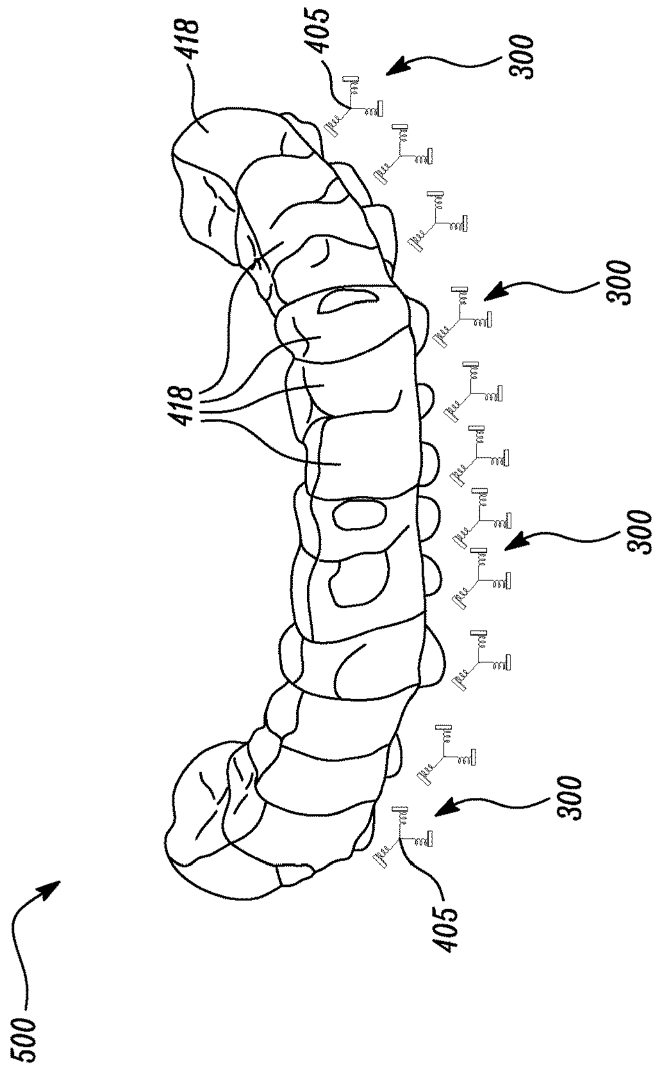
FIG. 8 is a schematic diagram of an updated PMM of the at least one tooth, according to another embodiment of the present disclosure.

FIG. 8 illustrates a schematic diagram of the updated PMM 500 of the plurality of teeth 60 (shown in FIG. 1), according to another embodiment of the present disclosure. In the illustrated embodiment of FIG. 8, the plurality of teeth 60 has different characteristics. In some embodiments, the processor 210 (shown in FIG. 3) is configured to remove the PDL model 410 (shown in FIG. 5) from the PMM 400 for each of the plurality of teeth 60 and apply the ROM 300 of the PDL 64 of each of the plurality of teeth 60 at the CoR 405 of each of the plurality of teeth 60 to generate the updated PMM 500.

Figure 9:
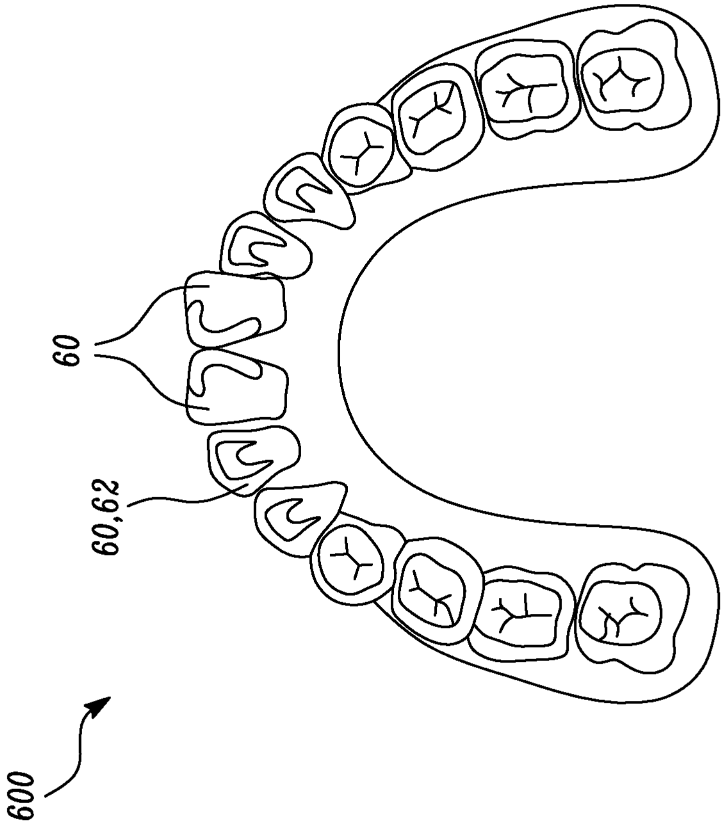
FIG. 9 is a schematic diagram of a design of the dental arch of the patient undergoing the orthodontic treatment having a target arrangement of the at least one tooth, according to an embodiment of the present disclosure.

FIG. 9 illustrates a schematic diagram of a design 600 of the dental arch of the patient undergoing the orthodontic treatment, according to an embodiment of the present disclosure. In the illustrated embodiment of FIG. 9, the design 600 represents the target arrangement of at least one tooth 62 from the plurality of teeth 60.

Referring to FIGS. 1 to 9, in some embodiments, the processor 210 is further configured to receive the target arrangement of the at least one tooth 62. In some embodiments, the processor 210 is further configured to determine one or more force parameters (e.g., the orthodontic force parameters F) based on the updated PMM 500 to achieve the target arrangement from the initial arrangement of the at least one tooth 62. In some embodiments, the processor 210 may be configured to determine the one or more force parameters based on the simplified mathematical representation (i.e., Equation 6 provided above) of the baseline PDL of the at least one tooth 62.

Figure 10:
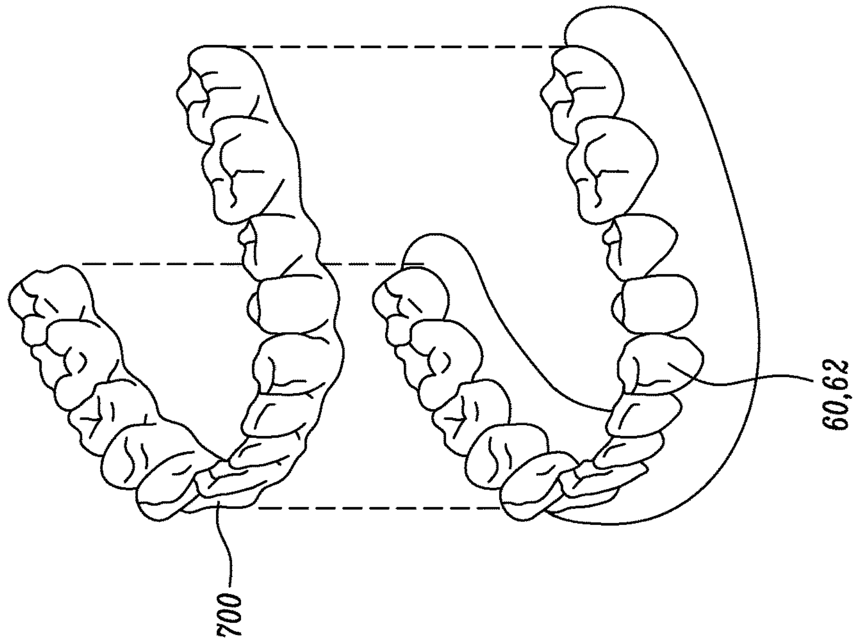
FIG. 10 is a schematic diagram of the design of the orthodontic appliance and the dental arch of the patient, according to an embodiment of the present disclosure.

FIG. 10 illustrates a schematic diagram of the design of the orthodontic appliance 700 and the dental arch of the patient, according to an embodiment of the present disclosure. The orthodontic appliance 700 applies the one or more force parameters to the at least one tooth 62 to achieve the target arrangement. In some embodiments, the processor 210 (shown in FIG. 3) is configured to generate the design of the orthodontic appliance 700, such that the orthodontic appliance 700 applies the one or more force parameters to the at least one tooth 62 to achieve the target arrangement.

Figure 17A:
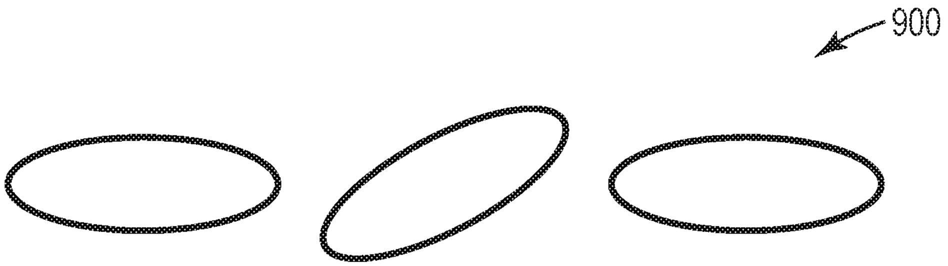
FIGS. 17A-17J depict a schematic view of a method for generating the design of the orthodontic appliance, according to an embodiment of the present disclosure
Figure 17B:
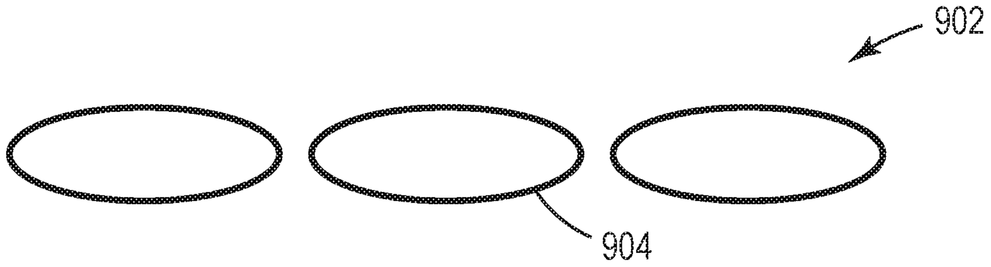
Figure 17C:
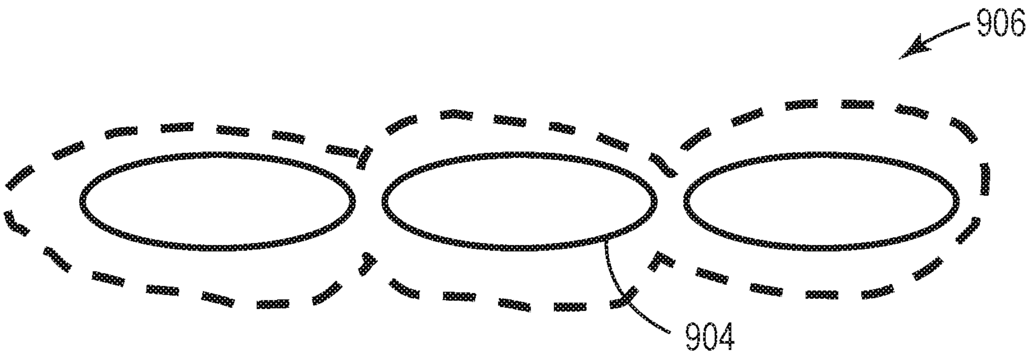
Figure 17D:
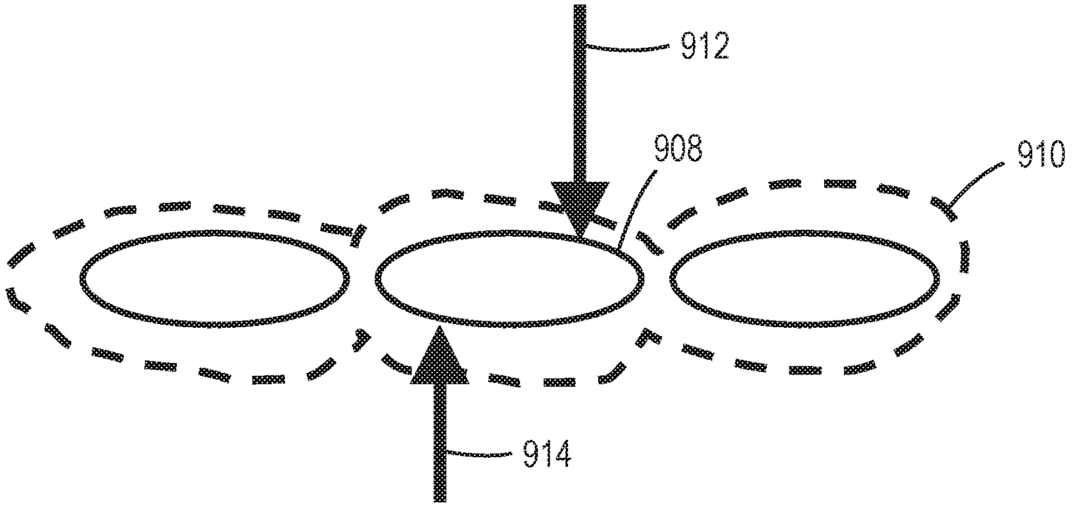
Figure 17E:
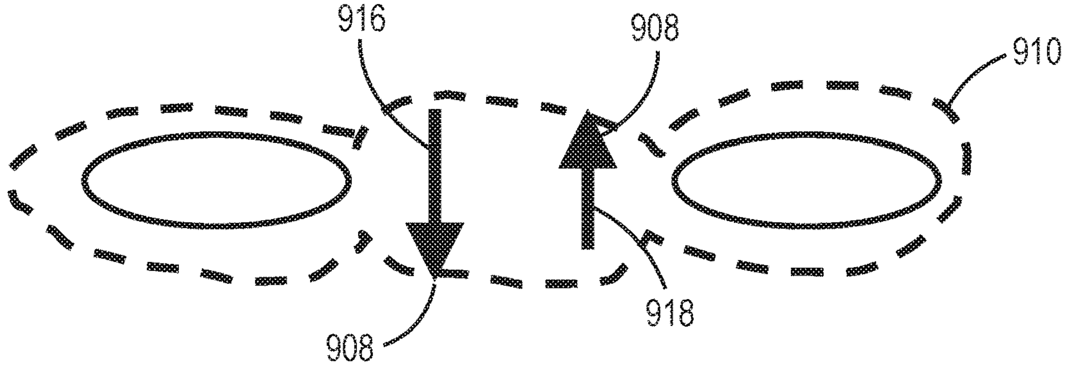
Figure 17F:
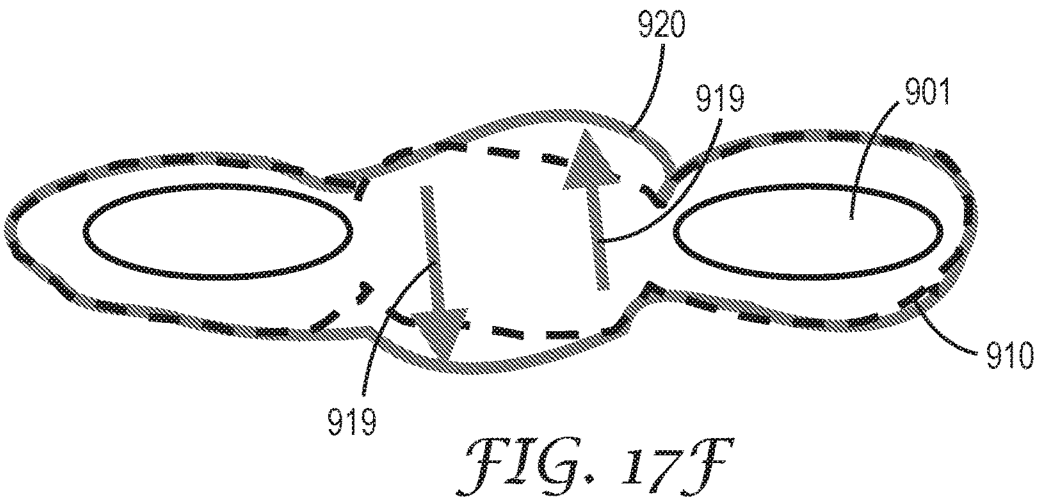
Figure 17G:
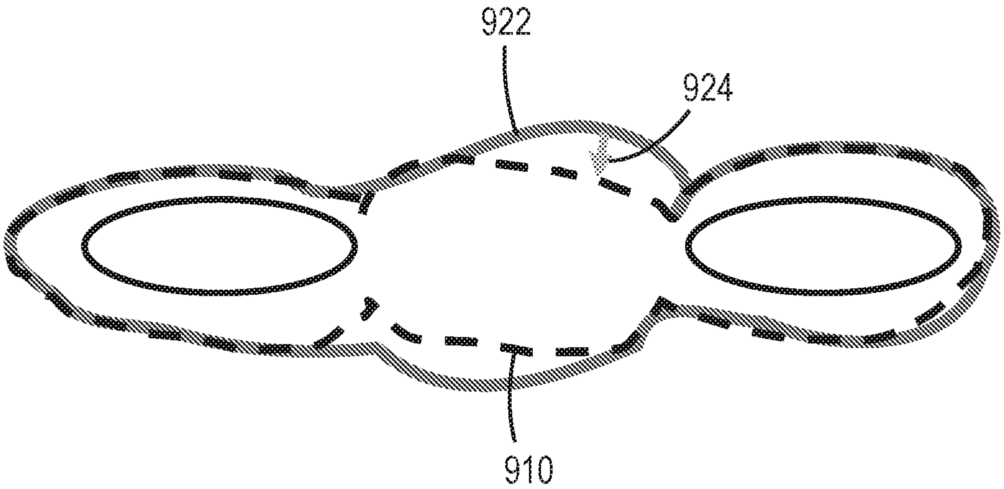
Figure 17H:
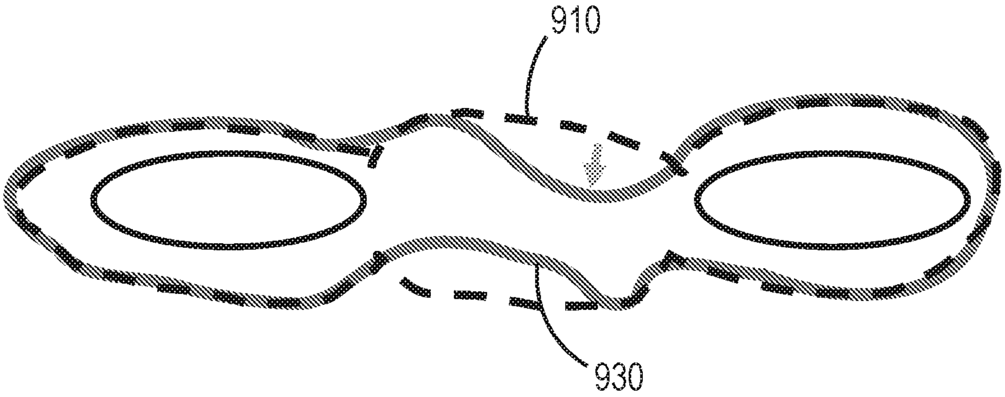
Figure 17I:
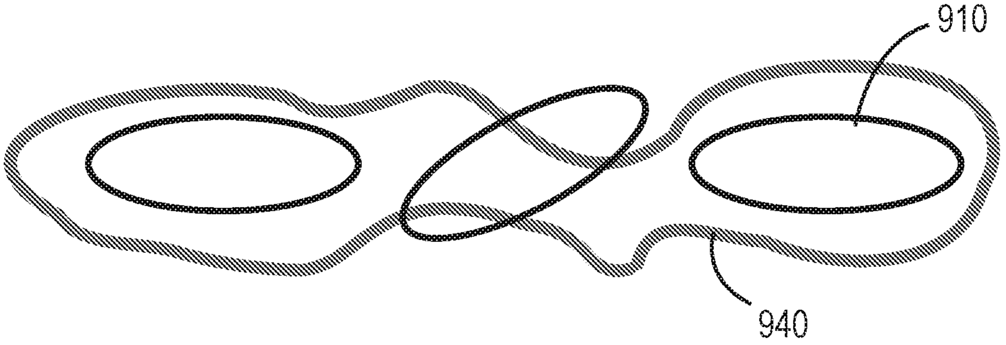
Figure 17J:
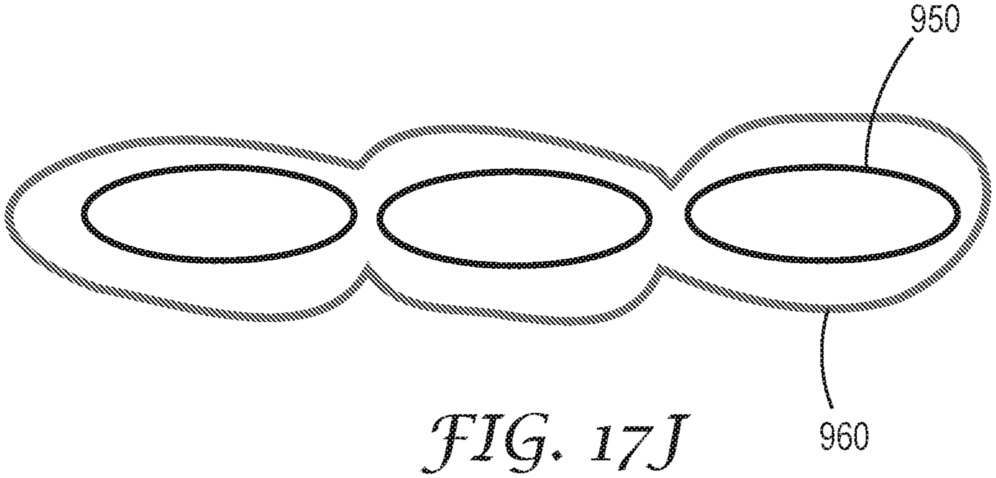

In some embodiments, the orthodontic appliance is designed using an inverse method. The method is shown in FIGS. 17A-17J, which depict certain elements in representative fashion and do not depict exact anatomical or appliance geometries. The teeth are represented as ovals, viewed in a direction generally perpendicular to the occlusal plane. In such embodiments, the method comprises some or all of the following steps:

i. Receiving a digital three-dimensional (3D) representation 900 of a patient's dentition comprising first tooth positions (FIG. 17A);
ii. Determining desired second positions of at least one tooth 904 (FIG. 17B) and creating a modified 3D representation 902 of the patient's dentition with at least one tooth 904 in the desired second position;
iii. Building a 3D model of an orthodontic appliance 906 corresponding to the second tooth positions (FIG. 17C);
iv. Generating a physics-based mathematical model (PMM) by combining the modified 3D representation of the patient's dentition 904 and the 3D model of the orthodontic appliance 906 (FIG. 17C);
v. Identifying at least one anticipated contact area 908 between the appliance 910 and the at least one tooth 904, based on the intersection between the first tooth positions and the shape of the appliance 910 that corresponds to the second tooth positions;
vi. Calculating the forces 912, 914 required to move at least one tooth from its first position to its second position, when applied at the likely contact areas, using a Reduced Order Model (ROM) of the periodontal ligament (PDL) of the at least one tooth (FIG. 17D);
vii. Modifying the PMM by removing the at least one tooth and applying the opposite of the required forces 916, 918 to move the at least one tooth from its first position to its second position at the at least one likely contact area 908 between the appliance 910 and at least one tooth (FIG. 17E);
viii. Simulating deformation 920 of the orthodontic appliance 910 due to the applied forces 919 and interactions between the appliance 910 and any teeth 901 included in the PMM (FIG. 17F);
ix. Calculating discrepancies 924 between the deformed appliance 922 and the 3D model of the orthodontic appliance 910 corresponding to the second tooth positions (FIG. 17G);
x. Updating the 3D model of the orthodontic appliance 910 to account for the discrepancies to create a discrepancy updated model 930 (FIG. 17H);
xi. Repeating steps v. through ix. until the discrepancies between the deformed appliance shape solution and the target deformed appliance shape are less than a maximum allowed discrepancy to created a final updated model of the appliance (940);
xii. Generating a validation PMM by combining the original 3D representation of the patient's dentition 900 and the final updated 3D model of the orthodontic appliance 940 (FIG. 17I); and
xiii. Solving/simulating the validation PMM and comparing the resulting predicted tooth positions (950) with the desired second tooth positions to validate or reject the final orthodontic appliance design (960) corresponding to the final updated 3D model of the orthodontic appliance (FIG. 17J).

In some embodiments the inverse method comprises a finite-element model. In some embodiments, the inverse method comprises an interference fit method to simulate interactions between the orthodontic appliance and any teeth included in the PMM. In some embodiments, the inverse method comprises simulating dynamic interactions between the orthodontic appliance and any teeth included in the PMM while the appliance is displaced toward and seated on the teeth.

Therefore, the system 200 may provide various insights, such as the one or more force parameters required to achieve the target arrangement, the one or more force parameters applied by the orthodontic appliance 700, a placement or an orientation of the orthodontic appliance 700 required to achieve the one or more force parameters, a time period required to achieve the target arrangement, and so forth. These insights may further improve the orthodontic treatment planning, the orthodontic treatment diagnostics, and the development of the orthodontic appliance 700.

Figure 11:
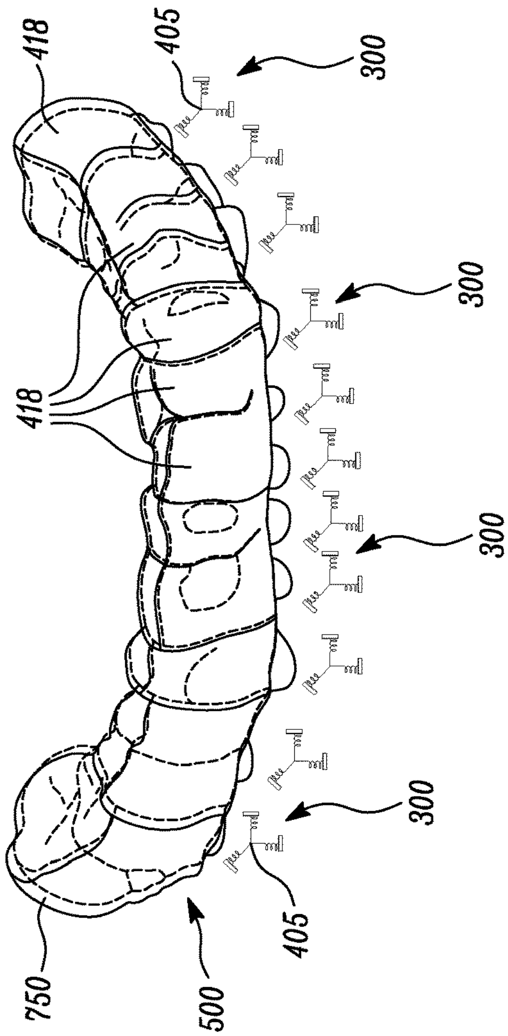
FIG. 11 is a schematic diagram of the updated PMM and a virtual orthodontic appliance design, according to an embodiment of the present disclosure.

FIG. 11 illustrates a schematic view of the updated PMM 500 and a virtual orthodontic appliance design 750, according to an embodiment of the present disclosure.

Referring to FIGS. 1 to 11, in some embodiments, the processor 210 is configured to receive an orthodontic appliance data 702 (schematically shown in FIG. 3). The orthodontic appliance data 702 includes at least one of orthodontic appliance material properties and orthodontic appliance geometry. In some embodiments, the processor 210 is configured to form the virtual orthodontic appliance design 750 based on the orthodontic appliance data 702.

In some embodiments, the processor 210 is configured to modify the updated PMM 500 of the at least one tooth 62 by adding the virtual orthodontic appliance design 750 to the updated PMM 500.

Figure 12:
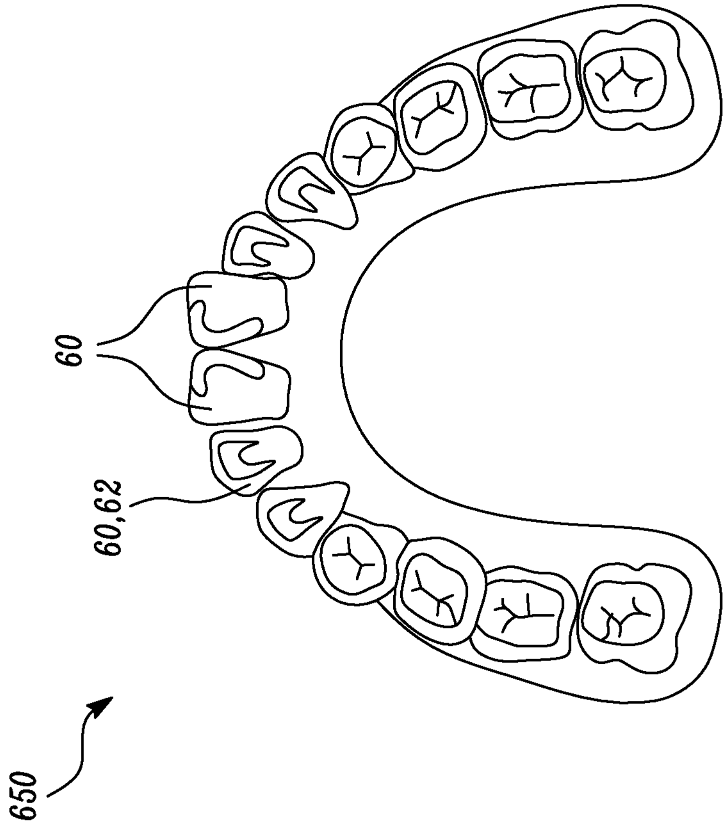
FIG. 12 is a schematic diagram of a design of the dental arch of the patient undergoing the orthodontic treatment having a resulting arrangement of the at least one tooth, according to an embodiment of the present disclosure.

FIG. 12 illustrates a schematic view of a design 650 of the dental arch of the patient, according to an embodiment of the present disclosure.

Referring to FIGS. 11 and 12, the design 650 illustrates the at least one tooth 62 in a resulting tooth arrangement due to an interaction between the at least one tooth 62 in the updated PMM 500 and the virtual orthodontic appliance design 750.

In some embodiments, the processor 210 (shown in FIG. 3) is configured to simulate the interaction between the at least one tooth 62 in the updated PMM 500 and the virtual orthodontic appliance design 750 and determine the resulting tooth arrangement.

In some embodiments, the processor 210 is further configured to compare the resulting tooth arrangement from the simulated interaction with the target arrangement.

Therefore, in some embodiments, the processor 210 may be configured to verify that the virtual orthodontic appliance design 750 is applying the one or more force parameters to achieve the target arrangement of the at least one tooth 62 based on the comparison.

In some embodiments, the system 200 may be configured to display the virtual orthodontic appliance design 750, via the display device 220, and modify the virtual orthodontic appliance design 750.

In some other embodiments, the processor 210 may execute one or more software applications to automatically modify the virtual orthodontic appliance design 750 if the virtual orthodontic appliance design 750 is not applying the one or more force parameters required to achieve the target arrangement.

In some other embodiments, the dental practitioner may manually modify the virtual orthodontic appliance design 750 if the virtual orthodontic appliance design 750 is not applying the one or more force parameters required to achieve the target arrangement via the input device 230 (shown in FIG. 3).

In some embodiments, the manufacturing device 240 (shown in FIG. 3) is configured to fabricate the orthodontic appliance 700 based on the virtual orthodontic appliance design 750. Specifically, the manufacturing device 240 may be configured to fabricate the orthodontic appliance 700 based on the virtual orthodontic appliance design 750 if the virtual orthodontic appliance design 750 is applying the one or more force parameters required to achieve the target arrangement.

Therefore, the system 200 may improve development of the virtual orthodontic appliance design 750 by modifying the orthodontic appliance data 702 (i.e., at least one of the orthodontic appliance material properties and the orthodontic appliance geometry) to fabricate the orthodontic appliance 700, such that the one or more force parameters required to achieve the target arrangement are applied by the orthodontic appliance 700. This may further improve the orthodontic treatment planning and the orthodontic treatment diagnostics.

Figure 13:
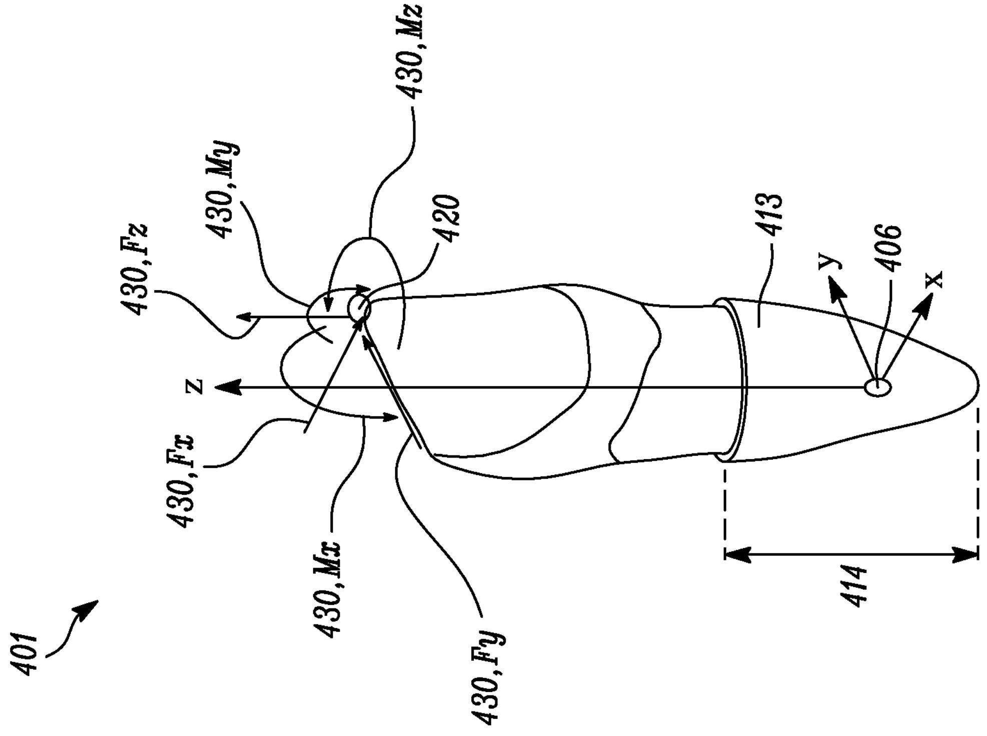
FIG. 13 is schematic view of a PMM, according to another embodiment of the present disclosure.

FIG. 13 illustrates a schematic view of a PMM 401, according to another embodiment of the present disclosure. The PMM 401 is substantially similar to the PMM 400 shown in FIG. 5. However, the PMM 401 includes a PDL model 413 of the PDL 64 (shown in FIG. 2) of the at least one tooth 62 (shown in FIG. 2). In this embodiment, the PDL 64 of the at least one tooth 62 has a height 414. The height 414 is different from the baseline height 411 (shown in FIG. 5) of the baseline PDL of a similar tooth, i.e., the at least one tooth 62.

The PDL 64 having the height 414 different from the baseline height 411 of the baseline PDL of the similar tooth may have different at least one center of resistance parameter $x_{CoR}$, $y_{CoR}$, $z_{CoR}$. This may be due to a differing constraint to the root 66 (shown in FIG. 2) of the at least one tooth 62 by the PDL 64. The at least one center of resistance parameter $x_{CoR}$, $y_{CoR}$, $z_{CoR}$ may be linearly proportional to the height 414 of the PDL 64. Specifically, the center of resistance parameter $z_{CoR}$ may be linearly proportional to the height 414 of the PDL 64.

Further, since a resistance to the tooth displacements 450 (shown in FIGS. 6B to 6D) may be different due to the differing constraint to the root 66, and as the PDL 64 having the height 414 different from the baseline height 411 may have a different volume to store a strain energy caused by the tooth displacements 450, there may be an increase in compliance of the PDL 64.

Therefore, the PDL 64 having the height 414 different from the baseline height 411 may have a different calibrated compliance matrix from the calibrated compliance matrix $C_{RP}$ and a different plurality of numerical values from the plurality of numerical values representing compliance of the baseline PDL.

Referring to FIGS. 1 to 5 and 13, in some embodiments, the processor 210 is configured to scale the ROM 300 of the PDL 64 of the at least one tooth 62.

In some embodiments, the processor 210 is configured to determine the height 414 of the PDL 64 of the at least one tooth 62 based on the digital 3D representation 100.

In some embodiments, the processor 210 is configured to determine at least one corrected center of resistance parameter different from corresponding at least one center of resistance parameter (e.g., the center of resistance parameter $x_{CoR}$) from the plurality of center of resistance parameters $x_{CoR}$, $y_{CoR}$, $z_{CoR}$ of the baseline PDL.

In some embodiments, the processor 210 is configured to determine a centroid 406 of the PDL 64 of the at least one tooth 62 from the digital 3D representation 100 (shown in FIG. 3). The centroid 406 corresponds to the at least one corrected center of resistance parameter. In some embodiments, the centroid 406 corresponds to a corrected CoR having the at least one corrected center of resistance parameter.

In some embodiments, the processor 210 is configured to determine a corrected reference mapping matrix Γs based on the at least one corrected center of resistance parameter (i.e., $z_{CoR}$) using Equation 4 in order to scale the ROM 300 of the PDL 64 of the at least one tooth 62 from that of the baseline PDL.

In some embodiments, the processor 210 is further configured to determine a first scale factor $f_A$ of the PDL 64 of the at least one tooth 62 in the digital 3D representation 100. In some embodiments, the first scale factor $f_A$ is a combination of the height 414 of the PDL 64 and the baseline height 411 (shown in FIG. 5) of the baseline PDL.

In some embodiments, the first scale factor $f_A$ is according to Equation 7 provided below:

$$f_A = \left(\frac{h_b}{h_s}\right)^2 \tag{7}$$

where, $h_s$ is the height 414 of the PDL 64, and $h_b$ is the baseline height 411.

In some embodiments, a combination of the first scale factor $f_A$ and the characteristic compliance matrix $C_{COR}$ of the baseline PDL associates a corrected characteristic compliance matrix $C_{CORH}$ of the PDL with the height 414 of the PDL 64.

In some embodiments, the corrected characteristic compliance matrix $C_{CORH}$ is obtained using Equation 8 provided below:

$$C_{CORH} = f_A C_{COR} \quad (8)$$

where, $C_{CORH}$ is a characteristic compliance matrix for the PDL 64 having the height 414.

In some embodiments, the $C_{CORH}$ may be obtained similarly as the characteristic compliance matrix $C_{COR}$ of the baseline PDL except the PDL model 410 has the height 414 instead of the baseline height 411.

In some embodiments, a characteristic compliance matrix ratio x is according to Equation 9 provided below:

$$x = C_{CORH}(C_{COR})^{-1} \quad (9)$$

The characteristic compliance matrix ratio x is indicative of effects of height variation of the PDL 64 from the baseline PDL.

Figure 14:
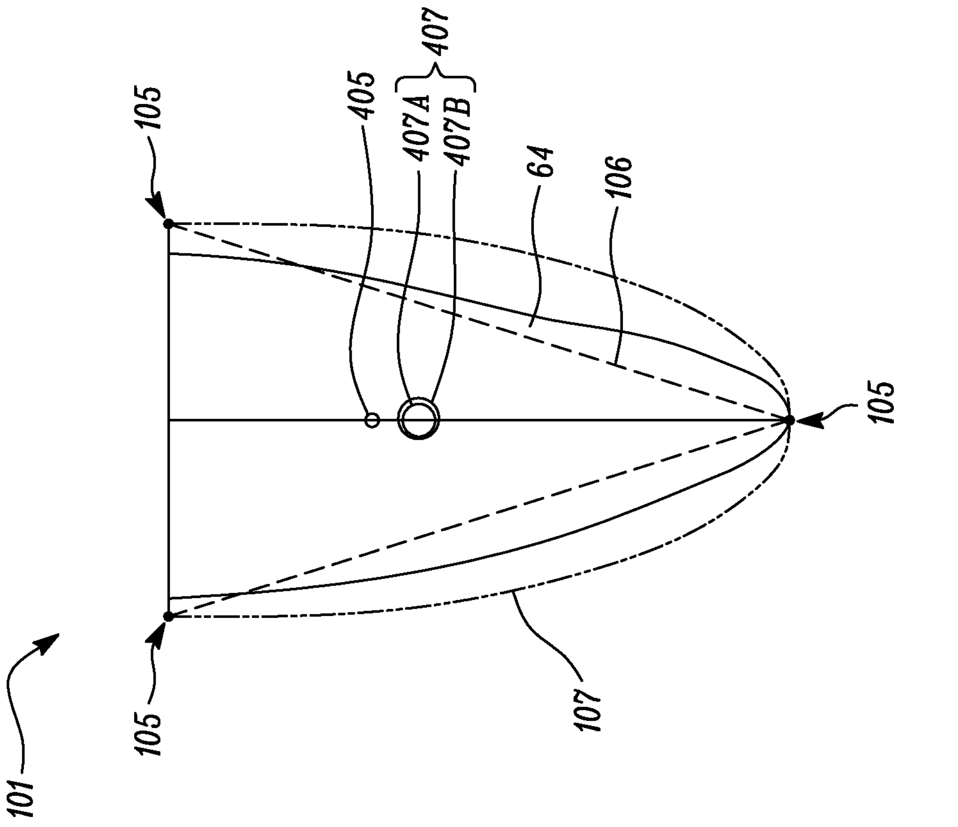
FIG. 14 is a schematic view of a two-dimensional (2D) image of the PDL of the at least one tooth, according to another embodiment of the present disclosure.

FIG. 14 illustrates the 2D image 101 of the PDL 64 of the at least one tooth 62 (shown in FIG. 2). In some embodiments, the 2D image 101 may be obtained from a 2D x-ray image without a need of digital 3D representation 100. In some other embodiments, the processor 210 (shown in FIG. 3) is configured to create the 2D image 101 of the PDL 64 of the at least one tooth 62 from the digital 3D representation 100 (shown in FIG. 1). The 2D image 101 of the PDL 64 is along a height axis (i.e., the z-axis) extending along the height 414 of the PDL 64 and an axis (i.e., the y-axis) orthogonal to the height axis.

In some embodiments, the processor 210 is configured to determine a plurality of points 105 on the PDL 64 of the at least one tooth 62 from the 2D image 101. In the illustrated embodiment of FIG. 14, the plurality of points 105 includes a top leftmost point on the PDL 64, a top rightmost point on the PDL 64, and a bottommost point on the PDL 64. Therefore, the plurality of points 105 includes three points. However, in some other embodiments, the plurality of points 105 may include any number of points based on desired application attributes.

In some embodiments, the processor 210 is configured to connect the plurality of points 105 to construct a triangle 106 or a semi-ellipse 107.

In some embodiments, the processor 210 is configured to determine an area centroid 407A of the triangle 106 or an area centroid 407B the semi-ellipse 107. The area centroids 407A, 407B are collectively referred to as the area centroid 407. The area centroid 407 corresponds to the at least one corrected center of resistance parameter. In some embodiments, the area centroid 407 corresponds to the corrected CoR having the at least one corrected center of resistance parameter.

Figure 15:
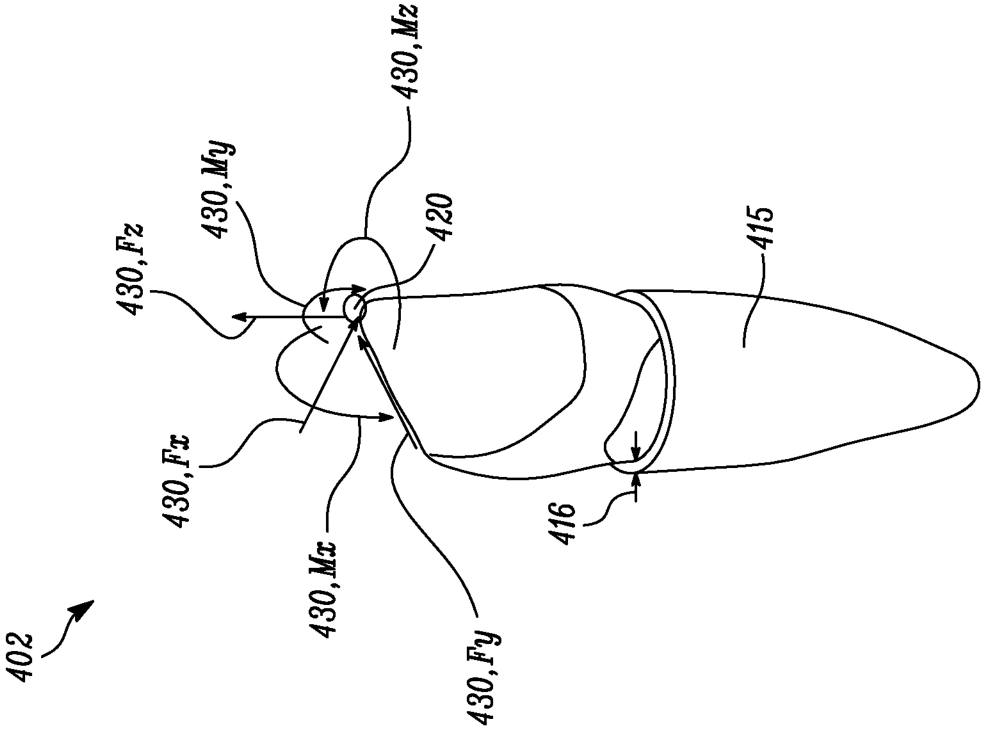
FIG. 15 is schematic view of a PMM, according to another embodiment of the present disclosure.

FIG. 15 illustrates a schematic view of a PMM 402, according to another embodiment of the present disclosure. The PMM 402 is substantially similar to the PMM 400 shown in FIG. 5. However, the PMM 402 includes a PDL model 415 of the PDL 64 (shown in FIG. 2) of the at least one tooth 62 (shown in FIG. 2). In this embodiment, the PDL 64 of the at least one tooth 62 has a thickness 416. The thickness 416 is different from the baseline thickness 412 (shown in FIG. 5) of the baseline PDL of the similar tooth, i.e., the at least one tooth 62.

The PDL 64 having the thickness 416 different from the baseline thickness 412 of the baseline PDL of the similar tooth may have a differing constraint to the root 66 (shown in FIG. 2) of the at least one tooth 62 by the PDL 64. For example, a thicker PDL may have lesser constraint to the root 66 of the at least one tooth 62 by the PDL 64. Thus, there may be an increase in compliance of the PDL 64.

Therefore, the PDL 64 having the thickness 416 different from the baseline thickness 412 may have a different calibrated compliance matrix from the calibrated compliance matrix $C_{RP}$ and a different plurality of numerical values from the plurality of numerical values representing compliance of the baseline PDL.

Referring to FIGS. 1 to 5 and 15, in some embodiments, the processor 210 is configured to determine the thickness 416 of the PDL 64 of the at least one tooth 62 based on the digital 3D representation 100.

In some embodiments, the processor 210 is configured to determine the at least one corrected center of resistance parameter (e.g., at least one of the plurality of center of resistance parameters $x_{CoR}$, $y_{CoR}$, $z_{CoR}$) different from corresponding at least one center of resistance parameter from the plurality of center of resistance parameters $x_{CoR}$, $y_{CoR}$, $z_{CoR}$ of the baseline PDL.

In some embodiments, the processor 210 is also configured to determine a corrected reference mapping matrix Γt based on the at least one corrected center of resistance parameter in order to map the one or more displacements at the center of resistance 405 of the at least one tooth 62 to the other locations of the at least one tooth 62.

In some embodiments, the processor 210 is further configured to determine a second scale factor $f_B$ of the PDL 64 of the at least one tooth 62 in the digital 3D representation 100. In some embodiments, the second scale factor $f_B$ is a combination of the thickness 416 of the PDL 64 and the baseline thickness 412 of the baseline PDL.

In some embodiments, the second scale factor $f_B$ is according to Equation 10 provided below:

$$f_B = \frac{t}{t_b} \quad (10)$$

where, t is the thickness 416 of the PDL 64, and $t_b$ is the baseline thickness 412.

In some embodiments, a combination of the second scale factor $f_B$ and the characteristic compliance matrix $C_{COR}$ of the baseline PDL associates a corrected characteristic compliance matrix $C_{CORT}$ of the PDL 64 with the thickness 416 of the PDL 64.

In some embodiments, the corrected characteristic compliance matrix $C_{CORT}$ is obtained using Equation 11 provided below:

$$C_{CORT} = f_B C_{COR} \quad (11)$$

Referring to FIGS. 1 to 5 and 13 to 15, in some embodiments, the height 414 and the thickness 416 are different from the baseline height 411 and the baseline thickness 412, respectively, of the baseline PDL of the similar tooth.

In some embodiments, the processor 210 is configured to determine the height 414 and the thickness 416 of the PDL 64 of the at least one tooth 62 in the digital 3D representation 100. In some embodiments, the processor 210 is configured to determine the height 414 and the thickness 416 of the PDL 64 of the at least one tooth 62 based on the digital 3D representation 100.

In some embodiments, the processor 210 is configured to determine the at least one corrected center of resistance parameter different from corresponding at least one center of resistance parameter from the plurality of center of resistance parameters $x_{CoR}$, $y_{CoR}$, $z_{CoR}$ of the baseline PDL. In some embodiments, the at least one corrected center of resistance parameter may be obtained by determining the centroid 406 and/or the area centroid 407.

In some embodiments, the processor 210 is also configured to determine a corrected reference mapping matrix Γst based on the at least one corrected center of resistance parameter in order to map the one or more displacements at the center of resistance 405 of the at least one tooth 62 to the other locations of the at least one tooth 62.

In some embodiments, the processor 210 is further configured to determine a combined scale factor $f_{AB}$ of the PDL 64 of the at least one tooth 62 in the digital 3D representation 100. In some embodiments, the combined scale factor $f_{AB}$ is a combination of the first scale factor $f_A$ and the second scale factor $f_B$.

In some embodiments, a combination of the combined scale factor $f_{AB}$ and the characteristic compliance matrix $C_{COR}$ of the baseline PDL associates a corrected characteristic matrix $C_{CORHT}$ of the PDL 64 with the height 414 and the thickness 416 of the PDL 64. In some embodiments, the corrected characteristic compliance matrix $C_{CORHT}$ is obtained using Equation 12 and Equation 13 provided below:

$$C_{CORHT} = f_{AB} C_{COR} \tag{12}$$

$$f_{AB} = f_A f_B \tag{13}$$

where.

$f_A$ and $f_B$ are defined in Equation 7 and Equation 10, respectively.

Therefore, the ROM 300 of the baseline PDL may be modified to reflect the specific variations (i.e., the height 414 and the thickness 416) in PDL shapes of different patients. The ROM 300 of the PDL 64 may accurately represent the mechanical response of the PDL 64. Since the ROM 300 of the baseline PDL may be modified using the first scale factor $f_A$, the second scale factor $f_B$, and/or the combined scale factor $f_{AB}$ to reflect the specific variations in PDL shapes of the patients, there may not be a need to develop a ROM for each specific patient.

Figure 16:
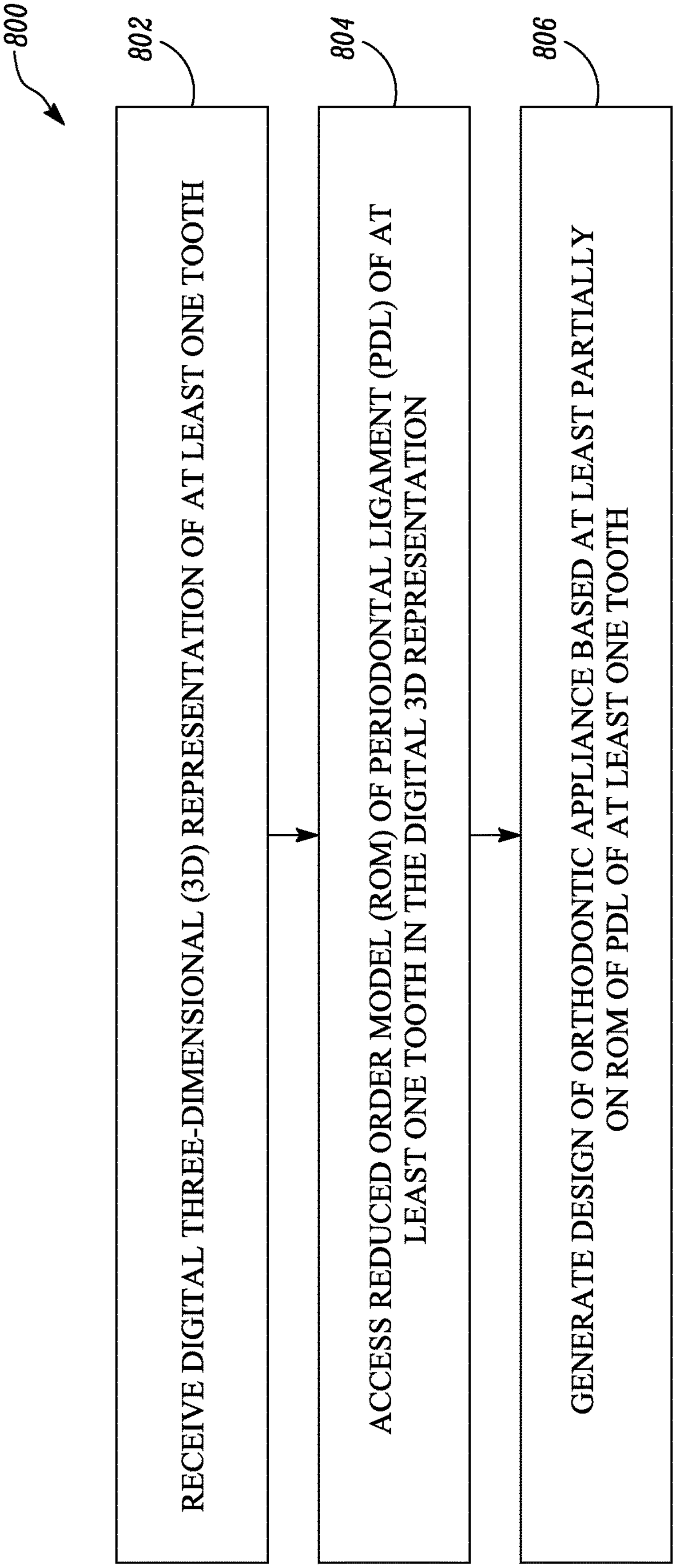
FIG. 16 is a flowchart of a method for generating the design of the orthodontic appliance, according to an embodiment of the present disclosure.

FIG. 16 is a flowchart illustrating a method 800 for generating the design of the orthodontic appliance 700, according to an embodiment of the present disclosure. The orthodontic appliance 700 is at least one of an aligner, braces, or combinations thereof.

The method 800 will be described with reference to FIGS. 1 to 15. The method 800 includes the following steps:

At step 802, the method 800 includes receiving the digital 3D representation 100 of the at least one tooth 62. In some embodiments, the method includes receiving the digital 3D representation 100 of the at least one tooth 62 by the processor 210.

At step 804, the method 800 includes accessing the ROM 300 of the PDL 54 of the at least one tooth 62 in the digital 3D representation 100. In some embodiments, the at least one tooth 62 includes the plurality of teeth 60 having the different characteristics. In some embodiments, the method 800 further includes accessing the ROM 300 of the PDL 64 for each of the plurality of teeth 60.

As discussed above, the ROM 300 represents the mechanical response of the PDL 54 of the at least one tooth 62. The ROM 300 includes the simplified mathematical representation including the plurality of numerical values representing compliance or stiffness of the PDL 64 of the at least one tooth 62 with respect to the three translational degrees of freedom 302 and the three rotational degrees of freedom 304.

In some embodiments, accessing the ROM 300 includes generating the ROM 300. In some embodiments, accessing the ROM 300 for each of the plurality of teeth 60 includes generating the ROM 300 for each of the plurality of teeth 60.

Further, in some embodiments, generating the ROM 300 includes characterizing the mechanical response of the baseline PDL of the at least one tooth 62 to the plurality of orthodontic force parameters 430 and determining the one or more ROM parameters of the ROM 300 of the baseline PDL based at least on the digital 3D representation 100.

In some embodiments, the method 800 further includes generating the PMM 400 of the at least one tooth 62 based on the digital 3D representation 100. The PMM 400 includes at least the PDL model 410. In some embodiments, generating the PMM 400 further includes generating the PDL model 410 of the at least one tooth 62 based on the non-linear material characteristics of the baseline PDL of the at least one tooth 62.

In some embodiments, the ROM 300 is determined further based on the PMM 400.

In some embodiments, generating the ROM 300 further includes determining, for the at least one tooth 62, the plurality of tooth movement parameters 440 corresponding to the plurality of orthodontic force parameters 430 applied at the reference point 420 disposed on the at least one tooth 62 based on the PMM 400. In some embodiments, each of the plurality of tooth movement parameters 440 includes the plurality of tooth displacements 450 at the reference point 420 due to the application of the corresponding orthodontic force parameter 430 from the plurality of orthodontic force parameters 430 at the reference point 420.

In some embodiments, generating the ROM 300 further includes determining the calibrated compliance matrix $C_{RP}$ of the baseline PDL of the at least one tooth 62 based at least on the plurality of tooth movement parameters 440 and the plurality of orthodontic force parameters 430.

In some embodiments, the calibrated compliance matrix $C_{RP}$ provides the correlation between the plurality of orthodontic force parameters 430 and the plurality of tooth movement parameters 440.

In some embodiments, generating the ROM 300 further includes determining the plurality of center of resistance parameters $x_{CoR}$, $y_{CoR}$, $z_{CoR}$ of the baseline PDL of the at least one tooth 62 based on the calibrated compliance matrix $C_{RP}$.

In some embodiments, generating the ROM 300 further includes determining the reference mapping matrix Γ based on the plurality of center of resistance parameters $x_{CoR}$, $y_{CoR}$, $z_{CoR}$ of the baseline PDL.

In some embodiments, generating the ROM 300 further includes determining the characteristic compliance matrix $C_{COR}$ of the baseline PDL of the at least one tooth 62 based on the calibrated compliance matrix $C_{RP}$ and the reference mapping matrix Γ. In some embodiments, the characteristic compliance matrix $C_{COR}$ represents the correlation between the orthodontic force parameter 430 applied at the CoR 405 with the one or more displacements at the CoR 405.

In some embodiments, the method 800 includes removing the PDL model 410 from the PMM 400 and applying the ROM 300 at the CoR 405 to generate the updated PMM 500 of the at least one tooth 62.

In some embodiments, the method 800 includes determining the plurality of numerical values representing compliance of the baseline PDL based on the characteristic compliance matrix $C_{COR}$. In some other embodiments, the method 800 includes determining the stiffness matrix as the inverse of the characteristic compliance matrix $C_{COR}$. In such embodiments, the method 800 includes determining the plurality of numerical values representing stiffness of the baseline PDL based on the stiffness matrix.

In some embodiments, the method 800 includes determining the simplified mathematical representation of the baseline PDL of the at least one tooth 62 based on the plurality of numerical values. In some embodiments, the method 800 includes determining the ROM 300 based on the simplified mathematical representation of the baseline PDL of the at least one tooth 62.

In some embodiments, the method 800 includes scaling the ROM 300 of the PDL 64 of the at least one tooth 62.

In some embodiments, scaling the ROM 300 includes determining the height 414 of the PDL 64 of the at least one tooth 62 based on the digital 3D representation 100. The height 414 is different from the baseline height 411 of the baseline PDL of the similar tooth.

In some embodiments, scaling the ROM 300 includes determining the thickness 416 of the PDL 64 of the at least one tooth 62 based on the digital 3D representation 100. The thickness 416 is different from the baseline thickness 412 of the baseline PDL of the similar tooth.

In some embodiments, scaling the ROM 300 includes determining the height 414 and the thickness 416 of the PDL 64 of the at least one tooth 62 in the digital 3D representation 100. The height 414 and the thickness 416 are different from the baseline height 411 and the baseline thickness 412, respectively, of the baseline PDL of the similar tooth.

In some embodiments, scaling the ROM 300 includes determining the at least one corrected center of resistance parameter different from the corresponding at least one center of resistance parameter from the plurality of center of resistance parameters of the baseline PDL.

In some embodiments, the method 800 includes determining the centroid 406 of the PDL 64 of the at least one tooth 62 from the digital 3D representation 100. The centroid 406 corresponds to the at least one corrected center of resistance parameter.

In some embodiments, the method 800 includes creating the 2D image 101 of the PDL 64 of the at least one tooth 62 from the digital 3D representation 100. In such embodiments, the method 800 includes determining the plurality of points 105 on the PDL 64 of the at least one tooth 62 from the 2D image 101. Further, in some embodiments, the method 800 includes connecting the plurality of points 105 to construct the triangle 106 or the semi-ellipse 107 and determining the area centroid 407 of the triangle 106 or the semi-ellipse 107. The area centroid 407 corresponds to the at least one corrected center of resistance parameter.

In some embodiments, scaling the ROM 300 includes determining the corrected reference mapping matrix Γs, Γt, Γst based on the at least one corrected center of resistance parameter in order to map the one or more displacements at the center of resistance 405 of the at least one tooth 62 to the other locations of the at least one tooth 62.

In some embodiments, the method 800 further includes determining the first scale factor $f_A$ of the PDL 64 of the at least one tooth 62 in the digital 3D representation 100. The first scale factor $f_A$ is the combination of the height 414 of the PDL 64 and the baseline height 411 of the baseline PDL. The combination of the first scale factor $f_A$ and the characteristic compliance matrix $C_{COR}$ of the baseline PDL associates the corrected characteristic compliance matrix $C_{CORH}$ of the PDL 64 with the height 414 of the PDL 64.

In some embodiments, the method 800 further includes determining the second scale factor $f_B$ of the PDL 64 of the at least one tooth 62 in the digital 3D representation 100. The second scale factor $f_B$ is the combination of the thickness 416 of the PDL 64 and the baseline thickness 412 of the baseline PDL. The combination of the second scale factor $f_B$ and the characteristic compliance matrix $C_{COR}$ of the baseline PDL associates the corrected characteristic compliance matrix $C_{CORT}$ of the PDL 64 with the thickness 416 of the PDL 64.

In some embodiments, the method 800 further includes determining the combined scale factor of the PDL 64 of the at least one tooth 62 in the digital 3D representation 100. The combined scale factor $f_{AB}$ is the combination of the first scale factor $f_A$ and the second scale factor $f_B$. The combination of the combined scale factor $f_{AB}$ and the characteristic compliance matrix of the baseline PDL $C_{COR}$ correlates the corrected characteristic matrix $C_{CORHT}$ of the PDL 64 with the height 414 and the thickness 416 of the PDL 64.

At step 806, the method 800 includes generating the design of the orthodontic appliance 700 based at least partially on the ROM 300 of the PDL 64 of the at least one tooth 62.

In some embodiments, the method 800 further includes receiving the target arrangement of the at least one tooth 62.

In some embodiments, the method 800 further includes determining the one or more force parameters based on the updated PMM 500 to achieve the target arrangement from the initial arrangement of the at least one tooth 62.

In some embodiments, the method 800 further includes generating the design of the orthodontic appliance 700, such that the orthodontic appliance 700 applies the one or more force parameters to the at least one tooth 62 to achieve the target arrangement.

In some embodiments, the method 800 further includes fabricating the orthodontic appliance 700 based on the design. In some embodiments, the orthodontic appliance 700 is fabricated using at least one of the additive manufacturing process and the subtractive manufacturing process.

In some embodiments, the method 800 further includes receiving the orthodontic appliance data 702. The orthodontic appliance data 702 includes at least one of the orthodontic appliance material properties and the orthodontic appliance geometry.

In some embodiments, the method 800 further includes forming the virtual orthodontic appliance design 750 based on the orthodontic appliance data 702.

In some embodiments, the method 800 further includes modifying the updated PMM 500 of the at least one tooth 62 by adding the virtual orthodontic appliance design 750 to the updated PMM 500.

In some embodiments, the method 800 further includes simulating the interaction between the at least one tooth 62 in the updated PMM 500 and the virtual orthodontic appliance design 750, and determining the resulting tooth arrangement. In some embodiments, the method 800 further includes comparing the resulting tooth arrangement from the simulated interaction with the target arrangement.

In some embodiments, the method 800 further includes verifying that the virtual orthodontic appliance design 750 is applying the one or more force parameters to achieve the target arrangement of the at least one tooth 62 based on the comparison and modifying the virtual orthodontic appliance design 750 if the virtual orthodontic appliance design 750 is not applying the one or more force parameters to achieve the target arrangement.

In some embodiments, the method 800 further includes displaying the virtual orthodontic appliance design 750 and modifying the virtual orthodontic appliance design 750. In some embodiments, the method 800 further includes fabricating the orthodontic appliance 700 based on the virtual orthodontic appliance design 750.

It will be appreciated that the arrangements presented herein may be varied in any number of aspects while still remaining within the scope of the disclosures herein.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method for generating a design of an orthodontic appliance, the method comprising:
- receiving a digital three-dimensional (3D) representation of at least one tooth;
- generating a Reduced Order Model (ROM) representing a biomechanical response of a periodontal ligament (PDL) of the at least one tooth based on the digital 3D representation, wherein generating the ROM comprises:
- determining, for the at least one tooth, a plurality of tooth movement parameters resulting from application of a plurality of orthodontic force parameters at a reference point of the at least one tooth;
- determining a calibrated compliance matrix of a baseline PDL of the at least one tooth based at least on the plurality of tooth movement parameters and the plurality of orthodontic force parameters;
- determining a plurality of center of resistance parameters of the baseline PDL based on the calibrated compliance matrix;
- determining a reference mapping matrix based on the plurality of center of resistance parameters of the baseline PDL; and
- determining a characteristic compliance matrix of the baseline PDL based on the calibrated compliance matrix and the reference mapping matrix; and
- generating the design of the orthodontic appliance based at least partially on the ROM of the PDL of the at least one tooth.

2. The method of claim 1, wherein generating the ROM further comprises:
- characterizing a biomechanical response of the baseline PDL of the at least one tooth to a plurality of orthodontic force parameters; and
- determining one or more ROM parameters of the ROM of the baseline PDL based at least on the digital 3D representation.

3. The method of claim 1, further comprising generating a physics-based mathematical model (PMM) of the at least one tooth based on the digital 3D representation, wherein the PMM comprises at least a PDL model, and wherein the ROM is generated further based on the PMM.

4. The method of claim 3, further comprising:
- removing the PDL model from the PMM; and
- applying the ROM at the center of resistance to generate an updated PMM of the at least one tooth;
- receiving a target arrangement of the at least one tooth; and
- determining one or more force parameters based on the updated PMM to achieve the target arrangement from an initial arrangement of the at least one tooth, wherein the digital 3D representation represents the initial arrangement of the at least one tooth.

5. The method of claim 4, wherein the design of the orthodontic appliance is generated to apply the one or more force parameters to the at least one tooth to achieve the target arrangement.

6. The method of claim 5, further comprising:
- receiving a target arrangement of the at least one tooth;
- receiving an orthodontic appliance data, wherein the orthodontic appliance data comprises at least one of orthodontic appliance material properties and orthodontic appliance geometry; and
- forming a virtual orthodontic appliance design based on the orthodontic appliance data.

7. The method of claim 6, further comprising modifying the updated PMM of the at least one tooth by adding the virtual orthodontic appliance design to the updated PMM and simulating an interaction between the at least one tooth in the updated PMM and the virtual orthodontic appliance design and determining a resulting tooth arrangement.

8. The method of claim 7, further comprising:
- verifying that the virtual orthodontic appliance design is applying one or more force parameters to achieve the target arrangement of the at least one tooth based on a comparison;
- modifying the virtual orthodontic appliance design if the virtual orthodontic appliance design is not applying the one or more force parameters to achieve the target arrangement; and
- fabricating the orthodontic appliance based on the virtual orthodontic appliance design.

9. The method of claim 1, further comprising:
- determining a plurality of numerical values representing compliance of the baseline PDL based on the characteristic compliance matrix;
- determining a simplified mathematical representation of the baseline PDL of the at least one tooth based on the plurality of numerical values; and
- determining the ROM based on the simplified mathematical representation of the baseline PDL of the at least one tooth.

10. The method of claim 1, further comprising:
determining a stiffness matrix as an inverse of the characteristic compliance matrix;
determining a plurality of numerical values representing stiffness of the baseline PDL based on the stiffness matrix;
determining a simplified mathematical representation of the baseline PDL of the at least one tooth based on the plurality of numerical values; and
determining the ROM based on the simplified mathematical representation of the baseline PDL of the at least one tooth.

11. The method of claim 1, wherein each of the plurality of tooth movement parameters comprises a plurality of tooth displacements at the reference point due to an application of a corresponding orthodontic force parameter from the plurality of orthodontic force parameters at the reference point.

12. The method of claim 1, wherein the calibrated compliance matrix provides a correlation between the plurality of orthodontic force parameters and the plurality of tooth movement parameters, and wherein the characteristic compliance matrix represents a correlation between an orthodontic force parameter applied at a center of resistance with one or more displacements at the center of resistance.

13. The method of claim 1, further comprising scaling the ROM of the PDL of the at least one tooth, wherein scaling the ROM comprises:
determining a height of the PDL of the at least one tooth based on the digital 3D representation, wherein the height is different from a baseline height of the baseline PDL of a similar tooth;
determining at least one corrected center of resistance parameter different from corresponding at least one center of resistance parameter from the plurality of center of resistance parameters of the baseline PDL; and
determining a corrected reference mapping matrix based on the at least one corrected center of resistance parameter in order to scale the ROM of the PDL of the at least one tooth from that of the baseline PDL.

14. The method of claim 13, further comprising determining a first scale factor of the PDL of the at least one tooth in the digital 3D representation, wherein the first scale factor is a combination of the height of the PDL and the baseline height of the baseline PDL, and wherein a combination of the first scale factor and the characteristic compliance matrix of the baseline PDL associates a corrected characteristic compliance matrix of the PDL with the height of the PDL.

15. The method of claim 13, further comprising:
creating a two-dimensional (2D) image of the PDL of the at least one tooth from the digital 3D representation;
determining a plurality of points on the PDL of the at least one tooth from the 2D image;
connecting the plurality of points to construct a triangle or a semi-ellipse; and
determining an area centroid of the triangle or the semi-ellipse, wherein the area centroid corresponds to the at least one corrected center of resistance parameter.

16. The method of claim 1, further comprising scaling the ROM of the PDL of the at least one tooth, wherein scaling the ROM comprises:
determining a thickness of the PDL of the at least one tooth based on the digital 3D representation, wherein the thickness is different from a baseline thickness of the baseline PDL of a similar tooth;
determining at least one corrected center of resistance parameter different from corresponding at least one center of resistance parameter from the plurality of center of resistance parameters of the baseline PDL; and
determining a corrected reference mapping matrix based on the at least one corrected center of resistance parameter in order to map the one or more displacements at the center of resistance of the at least one tooth to the other locations of the at least one tooth.

17. The method of claim 1, further comprising scaling the ROM of the PDL of the at least one tooth, wherein scaling the ROM comprises:
determining a height and a thickness of the PDL of the at least one tooth in the digital 3D representation, wherein the height and the thickness are different from a baseline height and a baseline thickness of the baseline PDL of a similar tooth;
determining at least one corrected center of resistance parameter different from corresponding at least one center of resistance parameter from the plurality of center of resistance parameters of the baseline PDL; and
determining a corrected reference mapping matrix based on the at least one corrected center of resistance parameter in order to map the one or more displacements at the center of resistance of the at least one tooth to the other locations of the at least one tooth.

18. The method of claim 1, further comprising determining a combined scale factor of the PDL of the at least one tooth in the digital 3D representation, wherein the combined scale factor is a combination of a first scale factor and a second scale factor, wherein the first scale factor is based on a height of the PDL of the at least one tooth and a baseline height of a baseline PDL, and wherein the second scale factor is based on a thickness of the PDL of the at least one tooth and a baseline thickness of the baseline PDL and wherein a combination of the combined scale factor and the characteristic compliance matrix of the baseline PDL associates a corrected characteristic matrix of the PDL with the height and the thickness of the PDL.

19. A device for generating a design of an orthodontic appliance, the device comprising:
one or more processors; and
one or more memories coupled to the one or more processors and storing instructions that, when executed by the one or more processors, cause the device to:
receive a digital three-dimensional (3D) representation of at least one tooth;
generate a Reduced Order Model (ROM) representing a biomechanical response of a periodontal ligament (PDL) of the at least one tooth based on the digital 3D representation, wherein generating the ROM comprises:
determining, for the at least one tooth, a plurality of tooth movement parameters resulting from application of a plurality of orthodontic force parameters at a reference point of the at least one tooth;
determining a calibrated compliance matrix of a baseline PDL of the at least one tooth based at least on the plurality of tooth movement parameters and the plurality of orthodontic force parameters;
determining a plurality of center of resistance parameters of the baseline PDL based on the calibrated compliance matrix;
determining a reference mapping matrix based on the plurality of center of resistance parameters of the baseline PDL; and determining a characteristic compliance matrix of the baseline PDL based on the calibrated compliance matrix and the reference mapping matrix; and generate the design of the orthodontic appliance based at least partially on the ROM of the PDL of the at least one tooth.

20. An apparatus for generating a design of an orthodontic appliance, comprising:

means for receiving a digital three-dimensional (3D) representation of at least one tooth;

means for determining, for the at least one tooth, a plurality of tooth movement parameters resulting from application of a plurality of orthodontic force parameters at a reference point of the at least one tooth;

means for determining a calibrated compliance matrix of a baseline periodontal ligament (PDL) of the at least one tooth based at least on the plurality of tooth movement parameters and the plurality of orthodontic force parameters;

means for determining a plurality of center of resistance parameters of the baseline PDL based on the calibrated compliance matrix;

means for determining a reference mapping matrix based on the plurality of center of resistance parameters of the baseline PDL;

means for determining a characteristic compliance matrix of the baseline PDL based on the calibrated compliance matrix and the reference mapping matrix;

means for generating a Reduced Order Model (ROM) representing a biomechanical response of the PDL of the at least one tooth based on the digital 3D representation and the characteristic compliance matrix;

means for generating a design of the orthodontic appliance based at least partially on the ROM of the PDL of the at least one tooth;

means for representing the ROM as a simplified mathematical representation comprising a plurality of numerical values representing compliance or stiffness of the PDL of the at least one tooth; and means for determining a scale factor of the PDL of the at least one tooth in the digital 3D representation, and wherein a combination of the scale factor and the characteristic compliance matrix of the baseline PDL associates a corrected characteristic matrix of the PDL with the height and the thickness of the PDL.

* * * * *